US012579268B2

(12) United States Patent
Ludmir et al.

(10) Patent No.:  US 12,579,268 B2
(45) Date of Patent:       Mar. 17, 2026

(54) SYSTEMS AND METHODS OF DATA SELECTION FOR ITERATIVE TRAINING USING ZERO KNOWLEDGE CLUSTERING

(71) Applicant: SentinelOne, Inc., Mountain View, CA (US)

(72) Inventors: Idan Ludmir, Mountain View, CA (US); Moshe Strenger, Mountain View, CA (US); Shlomi Salem, Mountain View, CA (US); Tzlil Gonen, Mountain View, CA (US)

(73) Assignee: SentinelOne, Inc., Mountain View, CA (US)

( * ) Notice: Subject to any disclaimer, the term of this patent is extended or adjusted under 35 U.S.C. 154(b) by 163 days.

(21) Appl. No.: 18/542,041

(22) Filed: Dec. 15, 2023

(65) Prior Publication Data

US 2024/0119153 A1      Apr. 11, 2024

Related U.S. Application Data

(63) Continuation of application No. PCT/US2023/072603, filed on Aug. 21, 2023.

(Continued)

(51) Int. Cl.
*G06F 21/00*          (2013.01)
*G06F 21/56*          (2013.01)

(52) U.S. Cl.
CPC .................................. *G06F 21/566* (2013.01)

(58) Field of Classification Search
CPC .... G06F 2218/12; G06F 16/285; G06F 21/56; G06F 2221/033; G06F 21/563;

(Continued)

(56) References Cited

U.S. PATENT DOCUMENTS

| 4,979,118 A | 12/1990 | Kheradpir |
| 5,311,593 A | 5/1994 | Carmi |

(Continued)

FOREIGN PATENT DOCUMENTS

| CN | 103607399 A | 2/2014 |
| CN | 109446755 A | 3/2019 |

(Continued)

OTHER PUBLICATIONS

AEfficient Virus Detection Using Dynamic Instruction Sequencesa— May 2009 (Year: 2009).

(Continued)

*Primary Examiner* — Tri M Tran
(74) *Attorney, Agent, or Firm* — Perkins Coie LLP

(57)                  ABSTRACT

A method may select, from a training data repository comprising a plurality of samples with known classifications, an initial training dataset comprising a second plurality of samples. A method may provide, as an input to a classification model, feature vectors associated with the initial training dataset and may train the classification model using the feature vectors. A method may determine a classification of each sample of a third plurality of samples using the classification model. A method may determine a difference between the determined and the known classification for each sample. A method may determine a selection weighting for each sample for based on the difference between the determined classification and the known classification. A method may select a subset from the from the third plurality of samples based on the determined selection weighting. A method may train the classification model using feature vectors associated with the subset.

20 Claims, 9 Drawing Sheets

Related U.S. Application Data

(60) Provisional application No. 63/373,165, filed on Aug. 22, 2022.

(58) Field of Classification Search
CPC .. G06F 16/906; G06F 16/3344; G06F 21/562; G06F 21/566; H04L 41/16; H04L 63/1433; G06N 5/01; G06N 20/20
See application file for complete search history.

(56) References Cited

U.S. PATENT DOCUMENTS

| | | | |
|---|---|---|---|
| 5,754,938 A | 5/1998 | Herz et al. |
| 6,026,474 A | 2/2000 | Carter et al. |
| 6,154,844 A | 11/2000 | Touboul et al. |
| 6,157,953 A | 12/2000 | Chang et al. |
| 6,728,716 B1 | 4/2004 | Bhattacharya et al. |
| 6,804,780 B1 | 10/2004 | Touboul |
| 6,836,888 B1 | 12/2004 | Basu et al. |
| 7,076,696 B1 | 7/2006 | Stringer |
| 7,093,239 B1 | 8/2006 | Van Der Made |
| 7,181,769 B1 | 2/2007 | Keanini et al. |
| 7,225,468 B2 | 5/2007 | Waisman et al. |
| 7,299,294 B1 | 11/2007 | Bruck et al. |
| 7,305,546 B1 | 12/2007 | Miller |
| 7,322,044 B2 | 1/2008 | Hrastar |
| 7,464,407 B2 | 12/2008 | Nakae et al. |
| 7,530,106 B1 | 5/2009 | Zaitsev et al. |
| 7,543,269 B2 | 6/2009 | Krueger et al. |
| 7,546,587 B2 | 6/2009 | Marr et al. |
| 7,574,740 B1 | 8/2009 | Kennis |
| 7,596,807 B2 | 9/2009 | Ptacek et al. |
| 7,596,808 B1 | 9/2009 | Wilkinson et al. |
| 7,665,139 B1 | 2/2010 | Szor et al. |
| 7,710,933 B1 | 5/2010 | Sundaralingam et al. |
| 7,739,516 B2 | 6/2010 | Brender et al. |
| 7,832,012 B2 | 11/2010 | Huddleston |
| 7,882,538 B1 | 2/2011 | Palmer |
| 7,890,612 B2 | 2/2011 | Todd et al. |
| 7,937,755 B1 | 5/2011 | Guruswamy |
| 7,958,549 B2 | 6/2011 | Nakae et al. |
| 7,975,018 B2 | 7/2011 | Unrau et al. |
| 7,984,129 B2 | 7/2011 | Vaught |
| 8,015,605 B2 | 9/2011 | Yegneswaran et al. |
| 8,024,795 B2 | 9/2011 | Newton |
| 8,042,186 B1 | 10/2011 | Polyakov et al. |
| 8,056,134 B1 | 11/2011 | Ogilvie |
| 8,065,722 B2 | 11/2011 | Barford et al. |
| 8,078,556 B2 | 12/2011 | Adi et al. |
| 8,082,471 B2 | 12/2011 | Khan |
| 8,131,281 B1 | 3/2012 | Hildner et al. |
| 8,141,154 B2 | 3/2012 | Gruzman et al. |
| 8,156,556 B2 | 4/2012 | Krishnamurthy |
| 8,171,545 B1 | 5/2012 | Cooley et al. |
| 8,181,033 B1 | 5/2012 | Paul et al. |
| 8,181,250 B2 | 5/2012 | Rafalovich et al. |
| 8,204,984 B1 | 6/2012 | Aziz et al. |
| 8,205,035 B2 | 6/2012 | Reddy et al. |
| 8,230,505 B1 | 7/2012 | Ahrens et al. |
| 8,239,947 B1 | 8/2012 | Glick et al. |
| 8,296,842 B2 | 10/2012 | Singh et al. |
| 8,327,442 B2 | 12/2012 | Herz et al. |
| 8,353,033 B1 | 1/2013 | Chen et al. |
| 8,370,931 B1 | 2/2013 | Chien et al. |
| 8,375,444 B2 | 2/2013 | Aziz et al. |
| 8,375,447 B2 | 2/2013 | Amoroso et al. |
| 8,413,238 B1 | 4/2013 | Sutton |
| 8,413,241 B2 | 4/2013 | Weeks et al. |
| 8,418,250 B2 | 4/2013 | Morris et al. |
| 8,438,386 B2 | 5/2013 | Hegli et al. |
| 8,438,626 B2 | 5/2013 | Anderson et al. |
| 8,443,442 B2 | 5/2013 | Wang et al. |
| 8,474,044 B2 | 6/2013 | Zawadowskiy et al. |
| 8,488,466 B2 | 7/2013 | Breslin et al. |
| 8,528,057 B1 | 9/2013 | Garrett |
| 8,528,087 B2 | 9/2013 | Hsu et al. |
| 8,538,578 B2 | 9/2013 | Battles et al. |
| 8,539,578 B1 | 9/2013 | Zhou et al. |
| 8,539,582 B1 | 9/2013 | Aziz et al. |
| 8,549,643 B1 | 10/2013 | Shou |
| 8,555,385 B1 | 10/2013 | Bhatkar et al. |
| 8,561,177 B1 | 10/2013 | Aziz et al. |
| 8,566,946 B1 | 10/2013 | Aziz et al. |
| 8,607,054 B2 | 12/2013 | Ramarathinam et al. |
| 8,607,340 B2 | 12/2013 | Wright |
| 8,627,475 B2 | 1/2014 | Loveland et al. |
| 8,677,494 B2 | 3/2014 | Edery et al. |
| 8,713,306 B1 | 4/2014 | Bennett |
| 8,719,937 B2 | 5/2014 | Sundaram et al. |
| 8,725,898 B1 | 5/2014 | Pradeep |
| 8,726,389 B2 | 5/2014 | Morris et al. |
| 8,732,296 B1 | 5/2014 | Thomas et al. |
| 8,752,173 B2 | 6/2014 | Yadav |
| 8,789,135 B1 | 7/2014 | Pani |
| 8,793,151 B2 | 7/2014 | Delzoppo et al. |
| 8,806,638 B1 | 8/2014 | Mani |
| 8,821,242 B2 | 9/2014 | Hinman et al. |
| 8,839,369 B1 | 9/2014 | Dai et al. |
| 8,844,041 B1 | 9/2014 | Kienzle et al. |
| 8,849,880 B2 | 9/2014 | Thelen |
| 8,850,582 B2 | 9/2014 | Endoh et al. |
| 8,880,435 B1 | 11/2014 | Catlett et al. |
| 8,881,282 B1 | 11/2014 | Aziz et al. |
| 8,893,278 B1 | 11/2014 | Chechik |
| 8,898,788 B1 | 11/2014 | Aziz et al. |
| 8,904,527 B2 | 12/2014 | Dawson et al. |
| 8,943,594 B1 | 1/2015 | Arrowood |
| 8,949,986 B2 | 2/2015 | Ben-Shalom et al. |
| 8,959,338 B2 | 2/2015 | Snow et al. |
| 8,973,142 B2 | 3/2015 | Shulman et al. |
| 8,984,637 B2 | 3/2015 | Karecha et al. |
| 9,009,829 B2 | 4/2015 | Stolfo et al. |
| 9,027,135 B1 | 5/2015 | Aziz |
| 9,043,920 B2 | 5/2015 | Gula et al. |
| 9,081,747 B1 | 7/2015 | Tabieros et al. |
| 9,117,078 B1 | 8/2015 | Chien et al. |
| 9,141,792 B2 | 9/2015 | Baluda et al. |
| 9,166,993 B1 | 10/2015 | Liu |
| 9,185,136 B2 | 11/2015 | Dulkin et al. |
| 9,195,480 B2 | 11/2015 | Wang et al. |
| 9,197,601 B2 | 11/2015 | Pasdar |
| 9,213,838 B2 | 12/2015 | Lu |
| 9,225,734 B1 | 12/2015 | Hastings |
| 9,240,976 B1 | 1/2016 | Murchison |
| 9,246,774 B2 | 1/2016 | Mataitis et al. |
| 9,270,690 B2 | 2/2016 | Kraitsman et al. |
| 9,305,165 B2 | 4/2016 | Snow et al. |
| 9,329,973 B2 | 5/2016 | Bhuyan |
| 9,330,259 B2 | 5/2016 | Klein et al. |
| 9,356,942 B1 | 5/2016 | Joffe |
| 9,356,950 B2 | 5/2016 | Vissamsetty et al. |
| 9,369,476 B2 | 6/2016 | Chekina et al. |
| 9,386,034 B2 | 7/2016 | Cochenour |
| 9,398,001 B1 | 7/2016 | Tidd |
| 9,407,602 B2 | 8/2016 | Feghali et al. |
| 9,413,721 B2 | 8/2016 | Morris et al. |
| 9,430,646 B1 | 8/2016 | Mushtaq et al. |
| 9,432,360 B1 | 8/2016 | Triandopoulos et al. |
| 9,438,614 B2 | 9/2016 | Herz |
| 9,495,188 B1 | 11/2016 | Ettema et al. |
| 9,503,470 B2 | 11/2016 | Gertner et al. |
| 9,547,516 B2 | 1/2017 | Thakkar et al. |
| 9,578,045 B2 | 2/2017 | Jaroch et al. |
| 9,591,006 B2 | 3/2017 | Siva et al. |
| 9,601,000 B1 | 3/2017 | Gruss et al. |
| 9,602,531 B1 | 3/2017 | Wallace et al. |
| 9,606,893 B2 | 3/2017 | Gupta et al. |
| 9,607,146 B2 | 3/2017 | Sridhara et al. |
| 9,609,019 B2 | 3/2017 | Vissamsetty et al. |
| 9,628,498 B1 | 4/2017 | Aziz et al. |
| 9,641,544 B1 | 5/2017 | Treat et al. |
| 9,641,550 B2 | 5/2017 | Kraitsman et al. |
| 9,705,904 B1 | 7/2017 | Davis et al. |
| 9,710,648 B2 | 7/2017 | Weingarten et al. |

(56) References Cited

U.S. PATENT DOCUMENTS

| | | | |
|---|---|---|---|
| 9,712,547 | B2 | 7/2017 | Touboul et al. |
| 9,749,349 | B1 | 8/2017 | Czarny et al. |
| 9,769,204 | B2 | 9/2017 | Vissamsetty et al. |
| 9,772,832 | B2 | 9/2017 | Rubio |
| 9,781,148 | B2 | 10/2017 | Mahaffey et al. |
| 9,807,092 | B1 | 10/2017 | Gutzmann |
| 9,807,115 | B2 | 10/2017 | Kolton et al. |
| 9,813,451 | B2 | 11/2017 | Honda et al. |
| 9,871,766 | B2 | 1/2018 | Syed et al. |
| 9,877,210 | B1 | 1/2018 | Hildner et al. |
| 9,888,032 | B2 | 2/2018 | Dekel et al. |
| 9,898,763 | B1 | 2/2018 | Vaynblat et al. |
| 9,942,270 | B2 | 4/2018 | Vissamsetty et al. |
| 10,025,928 | B2 | 7/2018 | Jaroch et al. |
| 10,044,675 | B1 | 8/2018 | Ettema et al. |
| 10,102,374 | B1 | 10/2018 | Cohen et al. |
| 10,169,586 | B2 | 1/2019 | Maciejak et al. |
| 10,237,282 | B2 | 3/2019 | Nelson et al. |
| 10,250,636 | B2 | 4/2019 | Vissamsetty et al. |
| 10,257,224 | B2 | 4/2019 | Jaroch et al. |
| 10,284,591 | B2 | 5/2019 | Giuliani et al. |
| 10,375,110 | B2 | 8/2019 | Vissamsetty et al. |
| 10,382,484 | B2 | 8/2019 | Shayevitz et al. |
| 10,476,891 | B2 | 11/2019 | Vissamsetty et al. |
| 10,509,905 | B2 | 12/2019 | Gupta et al. |
| 10,542,044 | B2 | 1/2020 | Vissamsetty et al. |
| 10,567,431 | B2 | 2/2020 | Vissamsetty et al. |
| 10,574,698 | B1 | 2/2020 | Sharifi Mehr |
| 10,599,842 | B2 | 3/2020 | Vissametty et al. |
| 10,599,844 | B2 | 3/2020 | Schmidtler et al. |
| 10,609,074 | B2 | 3/2020 | Vissamsetty et al. |
| 10,757,090 | B2 | 8/2020 | Kahol et al. |
| 10,826,941 | B2 | 11/2020 | Jain et al. |
| 10,855,671 | B2 | 12/2020 | Kahol et al. |
| 10,938,854 | B2 | 3/2021 | Strogov et al. |
| 11,032,301 | B2 | 6/2021 | Mandrychenko et al. |
| 11,038,658 | B2 | 6/2021 | Vissamsetty et al. |
| 11,171,974 | B2 | 11/2021 | Gertner et al. |
| 11,470,115 | B2 | 10/2022 | Vissamsetty et al. |
| 11,481,503 | B2 | 10/2022 | Gitelman et al. |
| 11,507,663 | B2 | 11/2022 | Cohen et al. |
| 11,522,894 | B2 | 12/2022 | Weingarten et al. |
| 11,579,857 | B2 | 2/2023 | Montag et al. |
| 11,580,218 | B2 | 2/2023 | Salem et al. |
| 11,615,184 | B2 | 3/2023 | Kutt et al. |
| 11,695,800 | B2 | 7/2023 | Vissamsetty et al. |
| 11,734,303 | B2 | 8/2023 | Cruanes et al. |
| 11,888,897 | B2 | 1/2024 | Vissamsetty et al. |
| 11,997,139 | B2 | 5/2024 | Vissamsetty et al. |
| 2002/0010800 | A1 | 1/2002 | Riley et al. |
| 2002/0016826 | A1 | 2/2002 | Johansson et al. |
| 2002/0078382 | A1 | 6/2002 | Sheikh et al. |
| 2002/0093917 | A1 | 7/2002 | Knobbe et al. |
| 2002/0095607 | A1 | 7/2002 | Lin-Hendel |
| 2002/0178374 | A1 | 11/2002 | Swimmer et al. |
| 2002/0194489 | A1 | 12/2002 | Almogy et al. |
| 2003/0065950 | A1 | 4/2003 | Yarborough |
| 2003/0145225 | A1 | 7/2003 | Bruton et al. |
| 2003/0145226 | A1 | 7/2003 | Bruton et al. |
| 2003/0152034 | A1 | 8/2003 | Zhang et al. |
| 2003/0188189 | A1 | 10/2003 | Desai et al. |
| 2003/0223367 | A1 | 12/2003 | Shay et al. |
| 2004/0083369 | A1 | 4/2004 | Erlingsson et al. |
| 2004/0172557 | A1 | 9/2004 | Nakae et al. |
| 2004/0243699 | A1 | 12/2004 | Koclanes et al. |
| 2004/0255157 | A1 | 12/2004 | Ghanea-Hercock |
| 2005/0050353 | A1 | 3/2005 | Thiele et al. |
| 2005/0076235 | A1 | 4/2005 | Ormazabal et al. |
| 2005/0076238 | A1 | 4/2005 | Ormazabal et al. |
| 2005/0108562 | A1 | 5/2005 | Khazan et al. |
| 2005/0138402 | A1 | 6/2005 | Yoon et al. |
| 2005/0160480 | A1 | 7/2005 | Birt et al. |
| 2005/0198507 | A1 | 9/2005 | Brender et al. |
| 2005/0204157 | A1 | 9/2005 | Johnson |
| 2005/0223239 | A1 | 10/2005 | Dotan |
| 2005/0240906 | A1 | 10/2005 | Kinderknecht et al. |
| 2005/0240989 | A1 | 10/2005 | Kim et al. |
| 2006/0053490 | A1 | 3/2006 | Herz et al. |
| 2006/0085543 | A1 | 4/2006 | Hrastar et al. |
| 2006/0101515 | A1 | 5/2006 | Amoroso et al. |
| 2006/0126522 | A1 | 6/2006 | Oh |
| 2006/0161989 | A1 | 7/2006 | Reshef et al. |
| 2006/0203774 | A1 | 9/2006 | Carrion-Rodrigo |
| 2006/0209701 | A1 | 9/2006 | Zhang et al. |
| 2006/0230129 | A1 | 10/2006 | Swami et al. |
| 2006/0236401 | A1 | 10/2006 | Fosdick |
| 2007/0022090 | A1 | 1/2007 | Graham |
| 2007/0025374 | A1 | 2/2007 | Stefan et al. |
| 2007/0067623 | A1 | 3/2007 | Ward |
| 2007/0097976 | A1 | 5/2007 | Wood et al. |
| 2007/0100905 | A1 | 5/2007 | Masters et al. |
| 2007/0101431 | A1 | 5/2007 | Clift et al. |
| 2007/0115993 | A1 | 5/2007 | Cohen |
| 2007/0143827 | A1 | 6/2007 | Nicodemus et al. |
| 2007/0143851 | A1 | 6/2007 | Nicodemus et al. |
| 2007/0177499 | A1 | 8/2007 | Gavrilescu et al. |
| 2007/0208822 | A1 | 9/2007 | Wang et al. |
| 2007/0208936 | A1 | 9/2007 | Ramos Robles |
| 2007/0209070 | A1 | 9/2007 | Yadav |
| 2007/0226320 | A1 | 9/2007 | Hager et al. |
| 2007/0240215 | A1 | 10/2007 | Flores et al. |
| 2007/0250930 | A1 | 10/2007 | Aziz et al. |
| 2007/0266422 | A1 | 11/2007 | Germano et al. |
| 2007/0282782 | A1 | 12/2007 | Carey et al. |
| 2008/0005782 | A1 | 1/2008 | Aziz |
| 2008/0018927 | A1 | 1/2008 | Martin et al. |
| 2008/0022000 | A1 | 1/2008 | Furuya et al. |
| 2008/0034429 | A1 | 2/2008 | Schneider |
| 2008/0046989 | A1 | 2/2008 | Wahl |
| 2008/0060074 | A1 | 3/2008 | Okuyama |
| 2008/0071728 | A1 | 3/2008 | Lim |
| 2008/0082722 | A1 | 4/2008 | Savagaonkar et al. |
| 2008/0083034 | A1 | 4/2008 | Kim et al. |
| 2008/0098476 | A1 | 4/2008 | Syversen |
| 2008/0104046 | A1 | 5/2008 | Singla et al. |
| 2008/0127346 | A1 | 5/2008 | Oh et al. |
| 2008/0162397 | A1 | 7/2008 | Zaltzman |
| 2008/0168559 | A1 | 7/2008 | Touitou et al. |
| 2008/0170566 | A1 | 7/2008 | Akimoto |
| 2008/0229415 | A1 | 9/2008 | Kapoor et al. |
| 2009/0077664 | A1 | 3/2009 | Hsu et al. |
| 2009/0089040 | A1 | 4/2009 | Monastyrsky et al. |
| 2009/0104046 | A1 | 4/2009 | Martin et al. |
| 2009/0158407 | A1 | 6/2009 | Nicodemus et al. |
| 2009/0158418 | A1 | 6/2009 | Rao et al. |
| 2009/0170566 | A1 | 7/2009 | Kwon et al. |
| 2009/0199296 | A1 | 8/2009 | Xie et al. |
| 2009/0241173 | A1 | 9/2009 | Troyansky |
| 2009/0249466 | A1 | 10/2009 | Motil et al. |
| 2009/0249470 | A1 | 10/2009 | Litvin et al. |
| 2009/0254973 | A1 | 10/2009 | Kwan |
| 2009/0288158 | A1 | 11/2009 | Izatt et al. |
| 2009/0296641 | A1 | 12/2009 | Bienas et al. |
| 2009/0327688 | A1 | 12/2009 | Li et al. |
| 2009/0328196 | A1 | 12/2009 | Bovee |
| 2010/0005339 | A1 | 1/2010 | Hooks |
| 2010/0077483 | A1 | 3/2010 | Stolfo et al. |
| 2010/0122317 | A1 | 5/2010 | Yadav |
| 2010/0122343 | A1 | 5/2010 | Ghosh et al. |
| 2010/0169973 | A1 | 7/2010 | Kim et al. |
| 2010/0269175 | A1 | 10/2010 | Stolfo et al. |
| 2010/0293615 | A1 | 11/2010 | Ye |
| 2010/0299430 | A1 | 11/2010 | Powers et al. |
| 2010/0332498 | A1 | 12/2010 | Svore et al. |
| 2011/0023118 | A1 | 1/2011 | Wright |
| 2011/0067107 | A1 | 3/2011 | Weeks et al. |
| 2011/0078309 | A1 | 3/2011 | Bloch et al. |
| 2011/0099633 | A1 | 4/2011 | Aziz |
| 2011/0113427 | A1 | 5/2011 | Dotan |
| 2011/0138456 | A1 | 6/2011 | Ormazabal et al. |
| 2011/0141937 | A1 | 6/2011 | Breslin et al. |
| 2011/0145920 | A1 | 6/2011 | Mahaffey et al. |
| 2011/0167494 | A1 | 7/2011 | Bowen et al. |
| 2011/0178930 | A1 | 7/2011 | Scheidt et al. |

(56) References Cited

U.S. PATENT DOCUMENTS

| | | |
|---|---|---|
| 2011/0185430 A1 | 7/2011 | Sallam |
| 2011/0209219 A1 | 8/2011 | Zeitlin et al. |
| 2011/0214176 A1 | 9/2011 | Burch et al. |
| 2011/0214182 A1 | 9/2011 | Adams et al. |
| 2011/0219443 A1 | 9/2011 | Hampel et al. |
| 2011/0219449 A1 | 9/2011 | St et al. |
| 2011/0225655 A1 | 9/2011 | Niemelä et al. |
| 2011/0247071 A1 | 10/2011 | Hooks et al. |
| 2011/0252434 A1 | 10/2011 | Stokes |
| 2011/0271341 A1 | 11/2011 | Satish et al. |
| 2011/0276597 A1 | 11/2011 | Little |
| 2011/0288940 A1 | 11/2011 | Horadan et al. |
| 2012/0023572 A1 | 1/2012 | Williams et al. |
| 2012/0030745 A1 | 2/2012 | Bauer |
| 2012/0030750 A1 | 2/2012 | Bhargava et al. |
| 2012/0079596 A1 | 3/2012 | Thomas et al. |
| 2012/0084866 A1 | 4/2012 | Stolfo |
| 2012/0106377 A1 | 5/2012 | Sommers et al. |
| 2012/0124363 A1 | 5/2012 | Dietrich et al. |
| 2012/0137342 A1 | 5/2012 | Hartrell et al. |
| 2012/0137367 A1 | 5/2012 | Dupont et al. |
| 2012/0144488 A1 | 6/2012 | Sankruthi |
| 2012/0151565 A1 | 6/2012 | Fiterman |
| 2012/0185563 A1 | 7/2012 | Sugiyama et al. |
| 2012/0240182 A1 | 9/2012 | Narayanaswamy et al. |
| 2012/0254995 A1 | 10/2012 | Sallam |
| 2012/0255003 A1 | 10/2012 | Sallam |
| 2012/0255004 A1 | 10/2012 | Sallam |
| 2012/0255012 A1 | 10/2012 | Sallam |
| 2012/0291090 A1 | 11/2012 | Srinivasan et al. |
| 2012/0297486 A1 | 11/2012 | Turbin |
| 2012/0297488 A1 | 11/2012 | Kapoor et al. |
| 2012/0324094 A1 | 12/2012 | Wyatt et al. |
| 2012/0331553 A1 | 12/2012 | Aziz et al. |
| 2013/0052992 A1 | 2/2013 | Lee et al. |
| 2013/0054682 A1 | 2/2013 | Malik et al. |
| 2013/0061097 A1 | 3/2013 | Mendel et al. |
| 2013/0080641 A1 | 3/2013 | Lui et al. |
| 2013/0086684 A1 | 4/2013 | Mohler |
| 2013/0091573 A1 | 4/2013 | Herz et al. |
| 2013/0097706 A1 | 4/2013 | Titonis et al. |
| 2013/0111547 A1 | 5/2013 | Kraemer |
| 2013/0133072 A1 | 5/2013 | Kraitsman et al. |
| 2013/0152200 A1 | 6/2013 | Alme et al. |
| 2013/0167236 A1 | 6/2013 | Sick |
| 2013/0191924 A1 | 7/2013 | Tedesco et al. |
| 2013/0198842 A1 | 8/2013 | Klein et al. |
| 2013/0212658 A1 | 8/2013 | Amaya et al. |
| 2013/0219217 A1 | 8/2013 | Seren et al. |
| 2013/0231084 A1 | 9/2013 | Raleigh |
| 2013/0239192 A1 | 9/2013 | Linga et al. |
| 2013/0242743 A1 | 9/2013 | Thomas et al. |
| 2013/0247190 A1 | 9/2013 | Spurlock |
| 2013/0290662 A1 | 10/2013 | Teal |
| 2013/0290729 A1 | 10/2013 | Pettigrew et al. |
| 2013/0291111 A1 | 10/2013 | Zhou et al. |
| 2013/0298192 A1 | 11/2013 | Kumar et al. |
| 2013/0298244 A1 | 11/2013 | Kumar et al. |
| 2013/0305377 A1 | 11/2013 | Herz |
| 2013/0329732 A1 | 12/2013 | Vyas et al. |
| 2013/0333040 A1 | 12/2013 | Diehl et al. |
| 2013/0340033 A1 | 12/2013 | Jones et al. |
| 2013/0346472 A1 | 12/2013 | Wheeldon |
| 2013/0347052 A1 | 12/2013 | Choudrie |
| 2014/0020046 A1 | 1/2014 | Heitzman |
| 2014/0046645 A1 | 2/2014 | White et al. |
| 2014/0053267 A1 | 2/2014 | Klein et al. |
| 2014/0059525 A1 | 2/2014 | Jawa et al. |
| 2014/0068326 A1 | 3/2014 | Quinn |
| 2014/0068779 A1 | 3/2014 | Tan et al. |
| 2014/0090061 A1 | 3/2014 | Avasarala et al. |
| 2014/0096229 A1 | 4/2014 | Burns et al. |
| 2014/0108794 A1 | 4/2014 | Barton et al. |
| 2014/0114609 A1 | 4/2014 | Maurer et al. |
| 2014/0123280 A1 | 5/2014 | Kedma et al. |
| 2014/0137246 A1 | 5/2014 | Baluda et al. |
| 2014/0150094 A1 | 5/2014 | Rao et al. |
| 2014/0157366 A1 | 6/2014 | Ko et al. |
| 2014/0165203 A1 | 6/2014 | Friedrichs et al. |
| 2014/0215617 A1 | 7/2014 | Smith et al. |
| 2014/0215621 A1 | 7/2014 | Xaypanya et al. |
| 2014/0215625 A1 | 7/2014 | Paul et al. |
| 2014/0237562 A1 | 8/2014 | Nandakumar |
| 2014/0237595 A1 | 8/2014 | Sridhara et al. |
| 2014/0237599 A1 | 8/2014 | Gertner et al. |
| 2014/0245376 A1 | 8/2014 | Hibbert et al. |
| 2014/0250524 A1 | 9/2014 | Meyers et al. |
| 2014/0259092 A1 | 9/2014 | Boucher et al. |
| 2014/0270157 A1 | 9/2014 | Youd et al. |
| 2014/0280864 A1 | 9/2014 | Yin et al. |
| 2014/0282816 A1 | 9/2014 | Xie et al. |
| 2014/0283038 A1 | 9/2014 | Call et al. |
| 2014/0283076 A1 | 9/2014 | Muttik |
| 2014/0289851 A1 | 9/2014 | Klein et al. |
| 2014/0298419 A1 | 10/2014 | Boubez et al. |
| 2014/0349611 A1 | 11/2014 | Kant et al. |
| 2014/0373091 A1 | 12/2014 | Kirner et al. |
| 2015/0006384 A1 | 1/2015 | Shaikh |
| 2015/0007312 A1 | 1/2015 | Pidathala et al. |
| 2015/0013006 A1 | 1/2015 | Shulman et al. |
| 2015/0013008 A1 | 1/2015 | Lukacs et al. |
| 2015/0033341 A1 | 1/2015 | Schmidtler et al. |
| 2015/0039513 A1 | 2/2015 | Adjaoute |
| 2015/0067763 A1 | 3/2015 | Dalcher et al. |
| 2015/0074810 A1 | 3/2015 | Saher et al. |
| 2015/0082430 A1 | 3/2015 | Sridhara et al. |
| 2015/0089655 A1 | 3/2015 | Choi et al. |
| 2015/0096048 A1 | 4/2015 | Zhang et al. |
| 2015/0113616 A1 | 4/2015 | Sampas |
| 2015/0121524 A1 | 4/2015 | Fawaz et al. |
| 2015/0121529 A1 | 4/2015 | Quinlan et al. |
| 2015/0128206 A1 | 5/2015 | Ben et al. |
| 2015/0128246 A1 | 5/2015 | Feghali et al. |
| 2015/0143496 A1 | 5/2015 | Thomas et al. |
| 2015/0150125 A1 | 5/2015 | Dulkin et al. |
| 2015/0150130 A1 | 5/2015 | Fiala et al. |
| 2015/0156214 A1 | 6/2015 | Kaminsky |
| 2015/0161024 A1 | 6/2015 | Gupta et al. |
| 2015/0161386 A1 | 6/2015 | Gupta et al. |
| 2015/0163121 A1 | 6/2015 | Mahaffey et al. |
| 2015/0172300 A1 | 6/2015 | Cochenour |
| 2015/0195291 A1 | 7/2015 | Zuk et al. |
| 2015/0199512 A1 | 7/2015 | Kim et al. |
| 2015/0200928 A1 | 7/2015 | Burch et al. |
| 2015/0200955 A1 | 7/2015 | Martin |
| 2015/0205962 A1 | 7/2015 | Swidowski et al. |
| 2015/0220735 A1 | 8/2015 | Paithane et al. |
| 2015/0244733 A1* | 8/2015 | Mohaisen ............. G06F 21/561 |
| | | 726/23 |
| 2015/0254161 A1 | 9/2015 | Baril et al. |
| 2015/0257194 A1 | 9/2015 | Cho |
| 2015/0264068 A1 | 9/2015 | Beauchesne |
| 2015/0264077 A1 | 9/2015 | Berger et al. |
| 2015/0268947 A1 | 9/2015 | Ionescu |
| 2015/0268989 A1 | 9/2015 | Busch et al. |
| 2015/0271200 A1 | 9/2015 | Brady et al. |
| 2015/0281267 A1 | 10/2015 | Danahy et al. |
| 2015/0286820 A1 | 10/2015 | Sridhara et al. |
| 2015/0288706 A1 | 10/2015 | Marshall |
| 2015/0310196 A1 | 10/2015 | Turgeman et al. |
| 2015/0326587 A1 | 11/2015 | Vissamsetty et al. |
| 2015/0326588 A1 | 11/2015 | Vissamsetty et al. |
| 2015/0326592 A1 | 11/2015 | Vissamsetty et al. |
| 2015/0326599 A1 | 11/2015 | Vissamsetty et al. |
| 2015/0346066 A1 | 12/2015 | Dutta et al. |
| 2015/0350213 A1 | 12/2015 | Varadarajan et al. |
| 2015/0350236 A1 | 12/2015 | Klinghofer et al. |
| 2015/0358345 A1 | 12/2015 | Clark et al. |
| 2015/0370560 A1 | 12/2015 | Tan et al. |
| 2015/0373039 A1 | 12/2015 | Wang |
| 2015/0379371 A1 | 12/2015 | Yoon et al. |
| 2015/0381376 A1 | 12/2015 | Wardman et al. |
| 2016/0028750 A1 | 1/2016 | Di et al. |
| 2016/0042179 A1 | 2/2016 | Weingarten et al. |

(56) References Cited

U.S. PATENT DOCUMENTS

| | | |
|---|---|---|
| 2016/0042180 A1 | 2/2016 | Sayre et al. |
| 2016/0055334 A1 | 2/2016 | Herwono et al. |
| 2016/0055337 A1 | 2/2016 | El-Moussa |
| 2016/0072838 A1 | 3/2016 | Kolton et al. |
| 2016/0078365 A1 | 3/2016 | Baumard |
| 2016/0080414 A1 | 3/2016 | Kolton et al. |
| 2016/0127352 A1 | 5/2016 | Xu et al. |
| 2016/0127413 A1 | 5/2016 | Kraitsman et al. |
| 2016/0142399 A1 | 5/2016 | Pace et al. |
| 2016/0191554 A1 | 6/2016 | Kaminsky |
| 2016/0212225 A1 | 7/2016 | Smith et al. |
| 2016/0261631 A1 | 9/2016 | Vissamsetty et al. |
| 2016/0285914 A1 | 9/2016 | Singh et al. |
| 2016/0315909 A1 | 10/2016 | Von et al. |
| 2016/0323300 A1 | 11/2016 | Boss et al. |
| 2016/0323316 A1 | 11/2016 | Kolton et al. |
| 2016/0381023 A1 | 12/2016 | Dulce et al. |
| 2017/0009391 A1 | 1/2017 | Fu et al. |
| 2017/0019425 A1 | 1/2017 | Ettema et al. |
| 2017/0026387 A1 | 1/2017 | Vissamsetty et al. |
| 2017/0032122 A1 | 2/2017 | Thakar et al. |
| 2017/0054754 A1 | 2/2017 | Saher et al. |
| 2017/0093910 A1 | 3/2017 | Gukal et al. |
| 2017/0126718 A1 | 5/2017 | Baradaran et al. |
| 2017/0134405 A1 | 5/2017 | Ahmadzadeh et al. |
| 2017/0141980 A1 | 5/2017 | Palanciuc et al. |
| 2017/0142068 A1 | 5/2017 | Devarajan et al. |
| 2017/0147796 A1 | 5/2017 | Sardesai et al. |
| 2017/0149787 A1 | 5/2017 | Niemela et al. |
| 2017/0149795 A1 | 5/2017 | Day, II |
| 2017/0149832 A1 | 5/2017 | Touboul et al. |
| 2017/0171244 A1 | 6/2017 | Vissamsetty et al. |
| 2017/0180421 A1 | 6/2017 | Shieh et al. |
| 2017/0201545 A1 | 7/2017 | Nicodemus et al. |
| 2017/0206142 A1 | 7/2017 | Pawar et al. |
| 2017/0206357 A1 | 7/2017 | Gorelik et al. |
| 2017/0230384 A1 | 8/2017 | Touboul et al. |
| 2017/0230402 A1 | 8/2017 | Greenspan et al. |
| 2017/0235967 A1 | 8/2017 | Ray et al. |
| 2017/0244729 A1 | 8/2017 | Fahrny et al. |
| 2017/0244749 A1 | 8/2017 | Shulman et al. |
| 2017/0244755 A1 | 8/2017 | Tsao et al. |
| 2017/0250855 A1 | 8/2017 | Patil et al. |
| 2017/0257375 A1 | 9/2017 | Dulkin et al. |
| 2017/0264639 A1 | 9/2017 | Sama et al. |
| 2017/0279839 A1 | 9/2017 | Vasseur et al. |
| 2017/0279846 A1 | 9/2017 | Osterweil et al. |
| 2017/0286676 A1 | 10/2017 | Weingarten et al. |
| 2017/0302458 A1 | 10/2017 | Berger et al. |
| 2017/0302653 A1 | 10/2017 | Ortner et al. |
| 2017/0302665 A1 | 10/2017 | Zou et al. |
| 2017/0302696 A1 | 10/2017 | Schutz et al. |
| 2017/0318054 A1 | 11/2017 | Vissamsetty et al. |
| 2017/0322959 A1 | 11/2017 | Tidwell et al. |
| 2017/0324774 A1 | 11/2017 | Ohayon et al. |
| 2017/0324777 A1 | 11/2017 | Ohayon et al. |
| 2017/0331849 A1 | 11/2017 | Yu et al. |
| 2017/0331856 A1 | 11/2017 | Vissamsetty et al. |
| 2017/0346802 A1 | 11/2017 | Gruskin et al. |
| 2017/0346853 A1 | 11/2017 | Wyatt et al. |
| 2017/0359370 A1 | 12/2017 | Humphries et al. |
| 2018/0013788 A1 | 1/2018 | Vissamsetty et al. |
| 2018/0020005 A1 | 1/2018 | Beiter et al. |
| 2018/0027006 A1 | 1/2018 | Zimmermann et al. |
| 2018/0027009 A1 | 1/2018 | Santos et al. |
| 2018/0027017 A1 | 1/2018 | Touboul et al. |
| 2018/0039776 A1 | 2/2018 | Loman et al. |
| 2018/0048665 A1 | 2/2018 | Shulman et al. |
| 2018/0063187 A1 | 3/2018 | Brian |
| 2018/0089430 A1 | 3/2018 | Mayo |
| 2018/0089431 A1 | 3/2018 | Nalluri et al. |
| 2018/0124096 A1 | 5/2018 | Schwartz et al. |
| 2018/0143915 A1 | 5/2018 | Gonzalez et al. |
| 2018/0146008 A1 | 5/2018 | Vissamsetty et al. |
| 2018/0173876 A1 | 6/2018 | Vissamsetty et al. |
| 2018/0183815 A1 | 6/2018 | Enfinger |
| 2018/0191593 A1 | 7/2018 | De et al. |
| 2018/0225592 A1 | 8/2018 | Ponnuswamy |
| 2018/0248896 A1 | 8/2018 | Challita et al. |
| 2018/0359272 A1 | 12/2018 | Mizrachi et al. |
| 2018/0359278 A1 | 12/2018 | Rusakov et al. |
| 2019/0042745 A1 | 2/2019 | Chen et al. |
| 2019/0052659 A1 | 2/2019 | Weingarten et al. |
| 2019/0068642 A1 | 2/2019 | Araujo et al. |
| 2019/0073475 A1 | 3/2019 | Gupta et al. |
| 2019/0114426 A1 | 4/2019 | Cohen et al. |
| 2019/0138639 A1 | 5/2019 | Pal et al. |
| 2019/0138725 A1 | 5/2019 | Gupta |
| 2019/0188212 A1* | 6/2019 | Miller .................. H04L 63/145 |
| 2019/0199736 A1 | 6/2019 | Howard et al. |
| 2019/0253453 A1 | 8/2019 | Vissamsetty et al. |
| 2019/0258807 A1 | 8/2019 | Dimaggio et al. |
| 2019/0294485 A1 | 9/2019 | Kukreja et al. |
| 2019/0294614 A1 | 9/2019 | Brodt et al. |
| 2019/0318100 A1 | 10/2019 | Bhatia et al. |
| 2019/0340353 A1 | 11/2019 | Mitelman |
| 2019/0349369 A1 | 11/2019 | Bengtson et al. |
| 2019/0354355 A1 | 11/2019 | Jacobson et al. |
| 2019/0379697 A1 | 12/2019 | Vissamsetty et al. |
| 2019/0392260 A1 | 12/2019 | Pang et al. |
| 2020/0050586 A1 | 2/2020 | Pal et al. |
| 2020/0051697 A1 | 2/2020 | Krishnamurti et al. |
| 2020/0076853 A1 | 3/2020 | Pandian et al. |
| 2020/0133865 A1 | 4/2020 | Mannava et al. |
| 2020/0143054 A1 | 5/2020 | Cohen et al. |
| 2020/0143061 A1 | 5/2020 | Kim et al. |
| 2020/0201620 A1 | 6/2020 | Beard |
| 2020/0218806 A1 | 7/2020 | Cho |
| 2020/0244677 A1 | 7/2020 | Abbaszadeh et al. |
| 2020/0252429 A1 | 8/2020 | Vissamsetty et al. |
| 2020/0274894 A1 | 8/2020 | Argoeti et al. |
| 2020/0374087 A1 | 11/2020 | Vissamsetty et al. |
| 2021/0029153 A1 | 1/2021 | Sugimoto et al. |
| 2021/0073374 A1 | 3/2021 | Mookken et al. |
| 2021/0073658 A1 | 3/2021 | Poole et al. |
| 2021/0117232 A1 | 4/2021 | Sriharsha et al. |
| 2021/0232291 A1 | 7/2021 | Abdulaal et al. |
| 2021/0263945 A1 | 8/2021 | Siebel et al. |
| 2021/0397710 A1 | 12/2021 | Cohen et al. |
| 2022/0050895 A1 | 2/2022 | Yu et al. |
| 2022/0070256 A1 | 3/2022 | Singh et al. |
| 2022/0086142 A1 | 3/2022 | Hecht |
| 2022/0101096 A1 | 3/2022 | Singer et al. |
| 2022/0164444 A1 | 5/2022 | Prudkovskij |
| 2022/0253526 A1 | 8/2022 | Sanders |
| 2022/0391496 A9 | 12/2022 | Salem et al. |
| 2023/0007025 A1 | 1/2023 | Weingarten et al. |
| 2023/0007026 A1 | 1/2023 | Weingarten et al. |
| 2023/0007027 A1 | 1/2023 | Weingarten et al. |
| 2023/0007028 A1 | 1/2023 | Weingarten et al. |
| 2023/0007029 A1 | 1/2023 | Weingarten et al. |
| 2023/0007030 A1 | 1/2023 | Weingarten et al. |
| 2023/0007031 A1 | 1/2023 | Weingarten et al. |
| 2023/0247046 A1 | 8/2023 | Peters et al. |
| 2023/0319089 A1 | 10/2023 | Chesla et al. |

FOREIGN PATENT DOCUMENTS

| | | |
|---|---|---|
| CN | 113297584 A | 8/2021 |
| CN | 113434858 A | 9/2021 |
| EP | 3171568 A1 | 5/2017 |
| EP | 3472746 A1 | 4/2019 |
| EP | 3968197 A1 | 3/2022 |
| ES | 2785350 T3 | 10/2020 |
| JP | 2006-106939 A | 4/2006 |
| JP | 2008-252625 A | 10/2008 |
| JP | 2013-168141 A | 8/2013 |
| JP | 2015-534690 A | 12/2015 |
| JP | 2016-512631 A | 4/2016 |
| JP | 2017-504102 A | 2/2017 |
| KR | 10-2015-0101811 A | 9/2015 |
| KR | 10-1969572 B1 | 4/2019 |
| KR | 10-2021-0079494 A | 6/2021 |
| WO | 02/27440 A2 | 4/2002 |

(56) References Cited

FOREIGN PATENT DOCUMENTS

| | | |
|---|---|---|
| WO | 2010/030169 A2 | 3/2010 |
| WO | 2012/027669 A1 | 3/2012 |
| WO | 2013/014672 | 1/2013 |
| WO | 2013/121951 A1 | 8/2013 |
| WO | 2014/126779 A1 | 8/2014 |
| WO | 2015/171780 A1 | 11/2015 |
| WO | 2015/171789 A1 | 11/2015 |
| WO | 2016/024268 A1 | 2/2016 |
| WO | 2016/081561 A1 | 5/2016 |
| WO | 2017/064710 A1 | 4/2017 |
| WO | 2017/068889 A1 | 4/2017 |
| WO | 2017/218872 A1 | 12/2017 |
| WO | 2019/032728 A1 | 2/2019 |
| WO | 2019/092530 A1 | 5/2019 |
| WO | 2019/245107 A1 | 12/2019 |
| WO | 2020/108357 A1 | 6/2020 |
| WO | 2022/076234 A1 | 4/2022 |

OTHER PUBLICATIONS

IBM Security Guardium Insights for IBM Cloud Park for Security, printed from https://www.ibm.com/downloads/cas/QY1RYRLP, printed May 26, 2021 in 12 pages.

"IBM Security Qradar SIEM Installation Guide" downloaded from http://www.siem.su/docs/ibm/Installation_andupdating/IBM_SecurityQRadar installation_Guide.pdf, printed 2013, vol. 7.2 in 54 pages.

"IBM Security Trusteer Apex Advanced malware Protection (SaaS) delivers an enterprise endpoint security solution to help protect organizations from advanced malware and targeted attacks" downloaded from https://www-01.ibm.com/common/ssi/rep_ca/0/877/ENUSZP14-0390/ENUSZP14- 0390.PDF, printed Aug. 5, 2014, in 9 pgs.

Abdelhameed, M.U, et al. Portable executable automatic protection using dynamic infection and code redirection; 2009 International Conference on Computer Engineering & Systems (pp. 501-507); (Year: 2009).

Abrath, Bert et al. Obfuscating Windows DLLs; 2015 IEEE/ACM 1st International Workshop on Software Protection (pp. 24-30); (Year: 2015).

Barbhuiya et al., "Detection of neighbor solicitation and advertisement spoofing in IPV6 neighbor discovery protocol." Proceedings of the 4th international conference on Security of information and networks. (2011).

Birrer, B, et al., "Using qualia and hierarchical models in malware detection", Journal of Information Assurance and Security, Dec. 29, 2009, pp. 247-255.

Chakraborty et al., "Hierarchical learning for automated malware classification", MILCOM 2017-2017 IEEE Military Communications Conference (MILCOM), Oct. 23-25, 2017, pp. 1-6.

Chen et al., "MitM attack by name collision: Cause analysis and vulnerability assessment in the new gTLD era." Security and Privacy (SP), 2016 IEEE Symposium on. IEEE (2016).

Dini et al., "Probabilistic Contract Compliance for Mobile Applications", Eighth International Conference on Availability, Reliability and Security (ARES) IEEE, Sep. 2-6, 2013, pp. 599-606.

Gu et al., "Malicious Shellcode Detection with Virtual Memory Snapshots," 2010 Proceedings IEEE INFOCOM, San Diego, CA, 2010, pp. 1-9, accessed Mar. 6, 2019.

IBM Guardium Documentation "Components and Topology", downloaded from https://www.ibm.com/docs/en/qsip/7.4?topic=deployment-qradar-architecture-overview, printed on Jun. 8, 2021, in 3 pages.

IBM Security Qradar Solution Brief "Visibility, detection, investigation and response" printed from https://www.ibm.com/downloads/cas/OP62GKAR, printed on May 26, 2021, in 11 pgs.

IBM Software, "Stepping up the battle against advanced threats", IBM Trusteer Apex Thought Leadership White Paper, Dec. 2013, WGW03043-USEN-OO.

IBM, "Qradar Architecture overview", downloaded from https://www.ibm.com/docs/en/qsip/7.4?topic=deployment-qradar-architecture-overview printed May 28, 2021, in 6 DQS.

Installing a Tanium Client—distributed also using user/password (not encrypted) from a hosted Module server, downloaded from https://docs.tanium.com/client/client/deployment.html#client_management on Apr. 2021.

Jack Ullrich, Detecting Manual Syscalls from User Mode, Winternl, Cybersecurity Research & Development, Feb. 10, 2021, 11 pages, https://winternl.com/detecting-manual-syscalls-from-user-mode/.

Laureano et al., M., "Intrusion detection in virtual machine environments. In Euromicro Conference, 2004. Proceedings." 30th (pp. 520-525). IEEE Sep. 30, 2004.

Liu et al., "Detecting Trojan Horses Based on System Behavior Using Machine Learning Method", International Conference on Machine Learning and Cybernetics (ICMLC), IEEE, Jul. 11-14, 2010, 02:S. 855-860.

Mahler, "A New Methodology for Information Security Risk Assessment for Medical Devices and Its Evaluation," 2020, The Department of Software and Information Systems Engineering, Ben-Gurion University of the Negev, Israel.

Matsuda, Wataru et al. "Real-Time Detection System Against Malicious Tools by Monitoring DLL on Client Computers;" 2019 IEEE Conference on Application, Information and Network Security (AINS) (pp. 36-41); (Year: 2019).

Moussaileb et al., "Ransomware's Early Mitigation Mechanisms," Proceedings ARES 2018 Proceedings of the 13th International Conference on Availability, Reliability and Security Article No. 2, 02:S 1-10 (2018).

Nisslmueller, U., "LOLBin detection through unsupervised learning An approach based on explicit featurization of the command line and parent-child relationships", University of Twente, Student Theses, Sep. 27, 2022, 72 pages.

Ornaghi et al., "Man in the middle attacks." Blackhat Conference Europe (2003).

Pandian, "Security Challenges of IoT and Medical Devices in Healthcare," Internet of Things, 1st Edition, 2020, Chapter 6, pp. 87-106.

Ramachandran et al., "Detecting ARP spoofing: An active technique." International Conference on Information Systems Security, Springer, Berlin, Heidelberg (2005).

Reaqta Hive, A.I. Based Endpoint Threat Response, Whitepaper, 27 pages (Apr. 6, 2017).

Schollmeier, "A Definition of Peer-to-Peer Networking for the Classification of Peer-to-Peer Architectures and Applications," Proceedings of the First International Conference on Peer-to-Peer Computing, IEEE (2002).

Shosha et al., A.F., "Evasion-resistant malware signature based on profiling kernel data structure objects." In 2012 7th International Conference on Risks and Security ofInternet and Systems (CRISIS) (pp. 1-8). IEEE., Oct. 31, 2012.

Shun-Wen Hsiao et al., "Sequence Feature Extraction for Malware Family Analysis via Graph Neural," Network, arXiv:2208.05476vl, Aug. 10, 2022, pp. 1-12.

Stine, "A cyber risk scoring system for medical devices," International Journal of Critical Infrastructure Protection, Dec. 2017, vol. 19, pp. 32-46.

Tanium™ Client Management 1.6 User Guide, downloaded from https://docs.tanium.com/client_management/client_management/index.html on Apr. 1, 2021.

Ullrich et al., "IPV6 Security: Attacks and Countermeasures in a Nutshell." 8th USENIX Workshop on Offensive Technologies (2015).

Xu et al., "Polymorphic Malicious Executable Scanner by API Sequence Analysis", Fourth International Conference on Hybrid Intelligent Systems, IEEE Dec. 5-8, 2004, pp. 378-383.

Zaldivar, "Investigating the Security Threats on Networked Medical Devices," 2020, 10th Annual Computing and Communication Workshop and Conference, Jan. 2020.

* cited by examiner

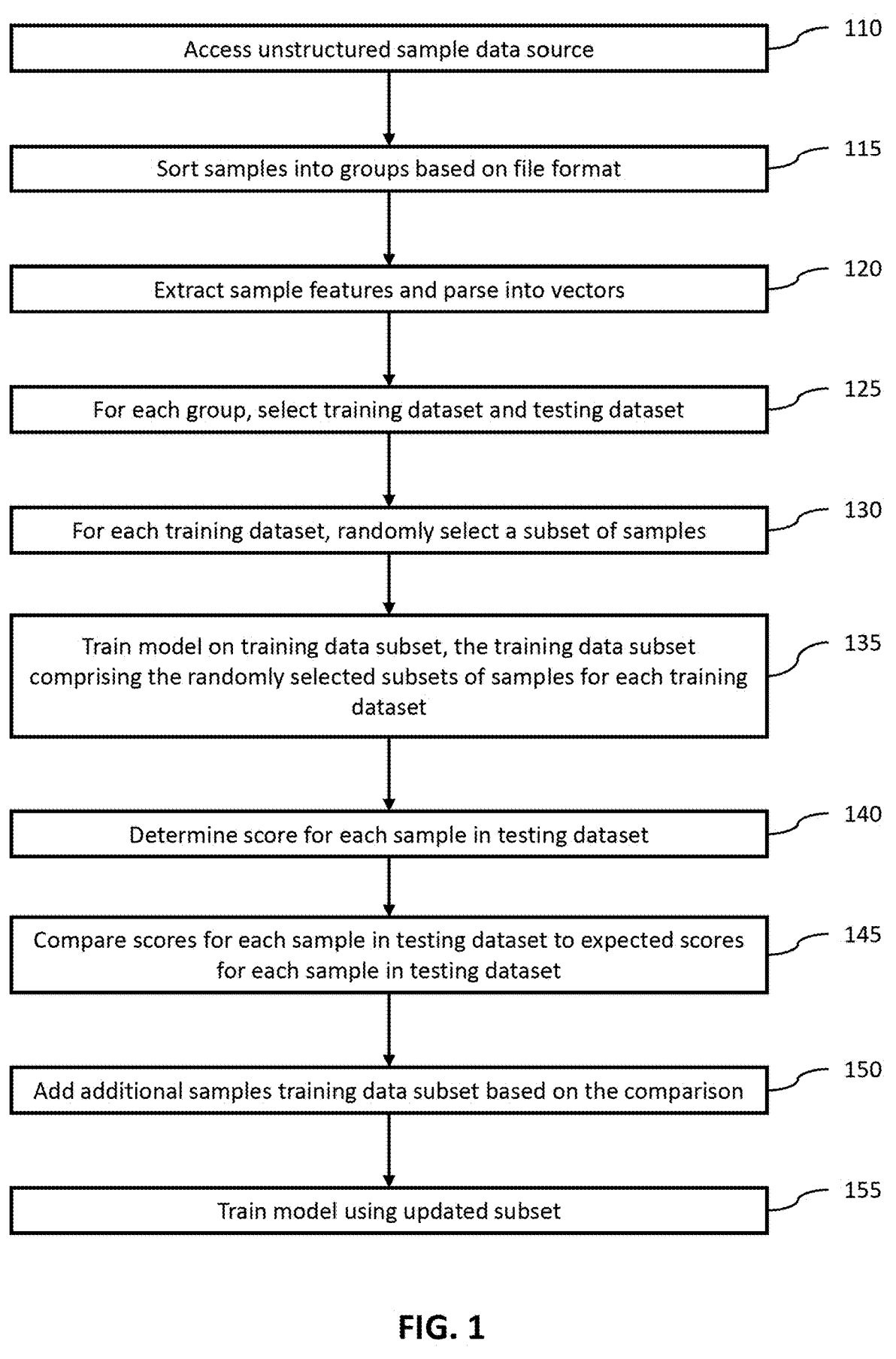

```
┌─────────────────────────────────────────────────────────────┐
│            Access unstructured sample data source             │──── 110
└─────────────────────────────────────────────────────────────┘
                              │
                              ▼
┌─────────────────────────────────────────────────────────────┐
│            Sort samples into groups based on file format       │──── 115
└─────────────────────────────────────────────────────────────┘
                              │
                              ▼
┌─────────────────────────────────────────────────────────────┐
│            Extract sample features and parse into vectors      │──── 120
└─────────────────────────────────────────────────────────────┘
                              │
                              ▼
┌─────────────────────────────────────────────────────────────┐
│       For each group, select training dataset and testing      │──── 125
│                          dataset                               │
└─────────────────────────────────────────────────────────────┘
                              │
                              ▼
┌─────────────────────────────────────────────────────────────┐
│      For each training dataset, randomly select a subset of    │──── 130
│                          samples                               │
└─────────────────────────────────────────────────────────────┘
                              │
                              ▼
┌─────────────────────────────────────────────────────────────┐
│    Train model on training data subset, the training data      │──── 135
│  subset comprising the randomly selected subsets of samples    │
│              for each training dataset                          │
└─────────────────────────────────────────────────────────────┘
                              │
                              ▼
┌─────────────────────────────────────────────────────────────┐
│        Determine score for each sample in testing dataset      │──── 140
└─────────────────────────────────────────────────────────────┘
                              │
                              ▼
┌─────────────────────────────────────────────────────────────┐
│  Compare scores for each sample in testing dataset to expected │──── 145
│         scores for each sample in testing dataset              │
└─────────────────────────────────────────────────────────────┘
                              │
                              ▼
┌─────────────────────────────────────────────────────────────┐
│  Add additional samples training data subset based on the      │──── 150
│                       comparison                               │
└─────────────────────────────────────────────────────────────┘
                              │
                              ▼
┌─────────────────────────────────────────────────────────────┐
│                Train model using updated subset                │──── 155
└─────────────────────────────────────────────────────────────┘
```

FIG. 1

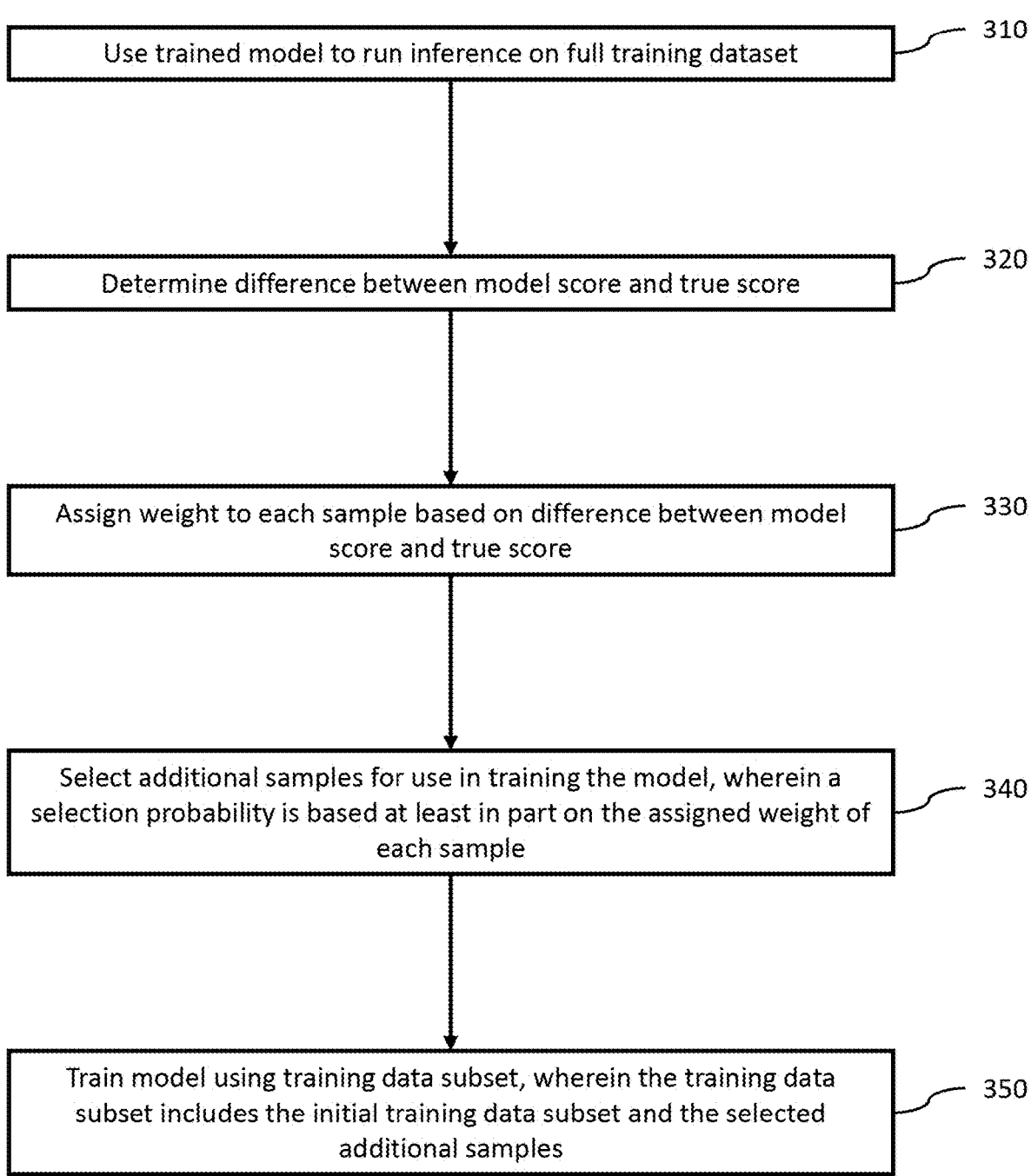

310 — Use trained model to run inference on full training dataset

320 — Determine difference between model score and true score

330 — Assign weight to each sample based on difference between model score and true score 340 — Select additional samples for use in training the model, wherein a selection probability is based at least in part on the assigned weight of each sample 350 — Train model using training data subset, wherein the training data subset includes the initial training data subset and the selected additional samples

FIG. 3

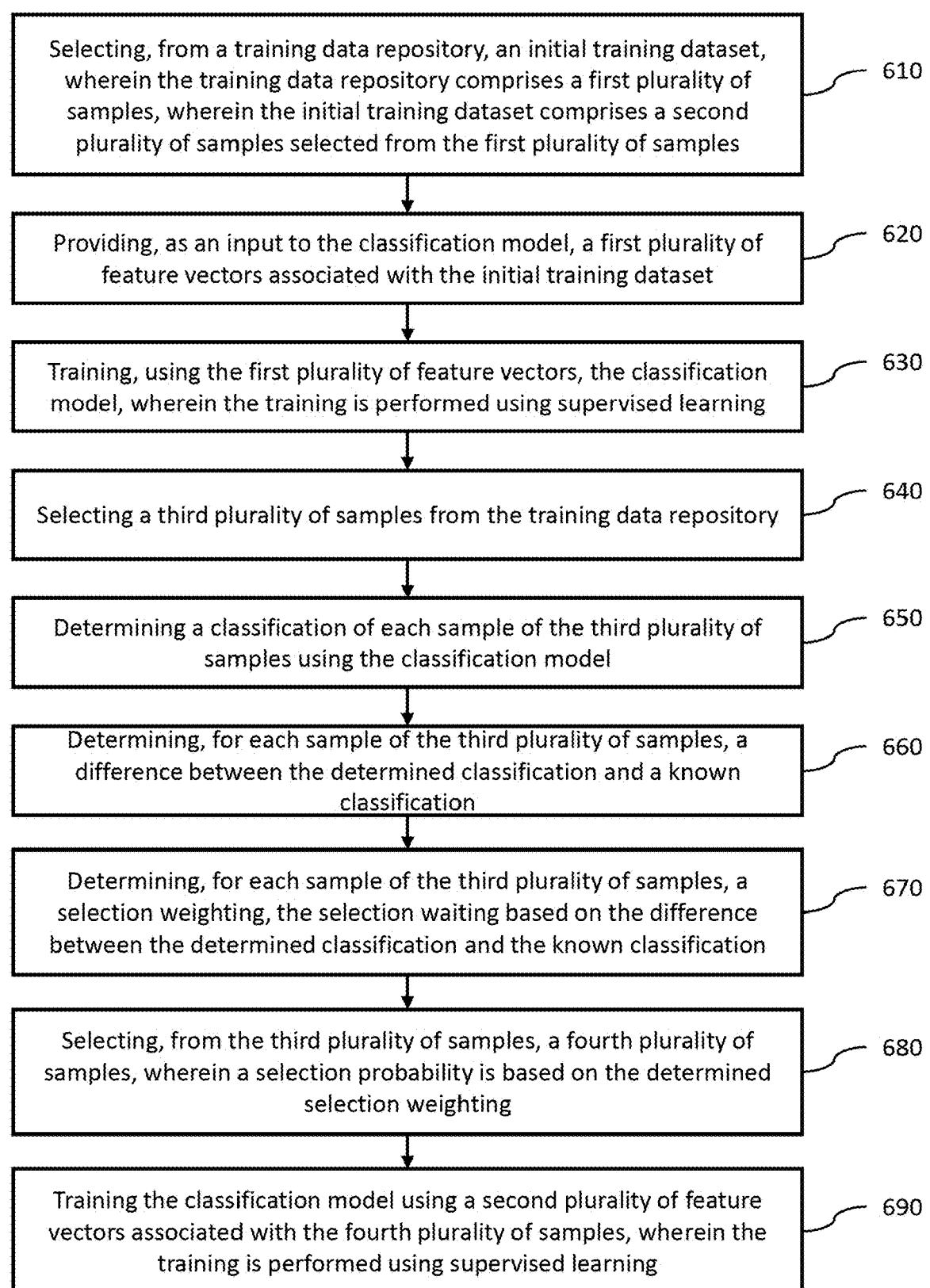

Selecting, from a training data repository, an initial training dataset, wherein the training data repository comprises a first plurality of samples, wherein the initial training dataset comprises a second plurality of samples selected from the first plurality of samples — 610

Providing, as an input to the classification model, a first plurality of feature vectors associated with the initial training dataset — 620

Training, using the first plurality of feature vectors, the classification model, wherein the training is performed using supervised learning — 630

Selecting a third plurality of samples from the training data repository — 640

Determining a classification of each sample of the third plurality of samples using the classification model — 650

Determining, for each sample of the third plurality of samples, a difference between the determined classification and a known classification — 660

Determining, for each sample of the third plurality of samples, a selection weighting, the selection waiting based on the difference between the determined classification and the known classification — 670

Selecting, from the third plurality of samples, a fourth plurality of samples, wherein a selection probability is based on the determined selection weighting — 680

Training the classification model using a second plurality of feature vectors associated with the fourth plurality of samples, wherein the training is performed using supervised learning — 690

FIG. 6

SYSTEMS AND METHODS OF DATA SELECTION FOR ITERATIVE TRAINING USING ZERO KNOWLEDGE CLUSTERING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of and claims the benefit of priority under 35 U.S.C. § 120 to International Application No. PCT/US23/72603, titled "SYSTEMS AND METHODS OF DATA SELECTION FOR ITERATIVE TRAINING USING ZERO KNOWLEDGE CLUSTERING," filed Aug. 21, 2023 which claims the benefit of priority of U.S. Provisional Application No. 63/373,165, titled "SYSTEMS AND METHODS OF DATA SELECTION FOR ITERATIVE TRAINING USER ZERO KNOWLEDGE CLUSTERING," filed Aug. 22, 2022, the contents of which are hereby incorporated by reference in their entirety and for all purposes as if set forth fully herein.

BACKGROUND

Field

The embodiments herein are generally directed to malware detection systems, methods, and devices.

DESCRIPTION

Malware detection and machine learning model training are significant problems in computing. Accordingly, improved methods for malware detection, machine learning model training, or both can be important.

SUMMARY

For purposes of this summary, certain aspects, advantages, and novel features of the invention are described herein. It is to be understood that not all such advantages necessarily may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

In some aspects, the techniques described herein relate to a computer-implemented method for training a classification model including: selecting, by a computing system, from a training data repository, an initial training dataset, wherein the training data repository includes a first plurality of samples, wherein the initial training dataset includes a second plurality of samples selected from the first plurality of samples, wherein each sample of the first plurality of samples includes a known classification; providing, by the computing system, as an input to the classification model, a first plurality of feature vectors associated with the initial training dataset; training, by the computing system, using the first plurality of feature vectors, the classification model, wherein the training is performed using supervised learning; selecting, by the computing system, a third plurality of samples from the training data repository; determining, by the computing system, a classification of each sample of the third plurality of samples using the classification model; determining, by the computing system, for each sample of the third plurality of samples, a difference between the determined classification and the known classification; determining, by the computing system, for each sample of the third plurality of samples, a selection weighting, the selection weighting based on the difference between the determined classification and the known classification; selecting, by the computing system, from the third plurality of samples, a fourth plurality of samples, wherein a selection probability is based on the determined selection weighting; and training, by the computing system, the classification model using a second plurality of feature vectors associated with the fourth plurality of samples, wherein the training is performed using supervised learning, wherein the model performs in a manner substantially similar to a model trained using a full content of the training data repository.

In some aspects, the techniques described herein relate to a computer-implemented method, wherein the classification model is configured for binary classification.

In some aspects, the techniques described herein relate to a computer-implemented method, wherein the binary classifications include a benign classification and a malicious classification.

In some aspects, the techniques described herein relate to a computer-implemented method, wherein the third plurality of samples includes the first plurality of samples minus the second plurality of samples.

In some aspects, the techniques described herein relate to a computer-implemented method, wherein the fourth plurality of samples is completely different from the second plurality of samples.

In some aspects, the techniques described herein relate to a computer-implemented method, further including: selecting a fifth plurality of samples from the training data repository; determining a classification of each sample of the fifth plurality of samples using the classification model; determining for each sample of the fifth plurality of samples, a difference between the determined classification and the known classification; determining, for each sample of the fifth plurality of samples, a second selection weighting; selecting, from the fifth plurality of samples, a sixth plurality of samples, wherein a selection probability is based on the determined selection weighting; and training the classification model using a third plurality of feature vectors associated with the sixth plurality of samples, wherein the training is performed using supervised learning.

In some aspects, the techniques described herein relate to a computer-implemented method, wherein the fifth plurality of samples includes the first plurality of samples minus the second plurality of samples and minus the fourth plurality of samples.

In some aspects, the techniques described herein relate to a computer-implemented method, wherein the samples include executable files.

In some aspects, the techniques described herein relate to a computer-implemented method, further including: determining a first performance characteristic of the model after training the model using the first plurality of feature vectors; determining a second performance characteristic of the model after training the model using the second plurality of feature vectors; comparing the first performance characteristic to the second performance characteristic; and determining, based on the comparison, that the first performance characteristic differs from the second performance characteristic by less than a threshold amount.

In some aspects, the techniques described herein relate to a computer system for training a classification model including: a processor; and a non-volatile storage medium having instructions embodied thereon, wherein the instructions, when executed by the processor, cause the computer system to execute a method including: selecting, from a training data repository, an initial training dataset, wherein the training data repository includes a first plurality of samples, wherein the initial training dataset includes a second plurality of samples selected from the first plurality of samples, wherein each sample of the first plurality of samples includes a known classification; providing, as an input to the classification model, a first plurality of feature vectors associated with the initial training dataset; training, using the first plurality of feature vectors, the classification model, wherein the training is performed using supervised learning; selecting a third plurality of samples from the training data repository; determining a classification of each sample of the third plurality of samples using the classification model; determining, for each sample of the third plurality of samples, a difference between the determined classification and the known classification; determining, for each sample of the third plurality of samples, a selection weighting, the selection weighting based on the difference between the determined classification and the known classification; selecting, from the third plurality of samples, a fourth plurality of samples, wherein a selection probability is based on the determined selection weighting; and training the classification model using a second plurality of feature vectors associated with the fourth plurality of samples, wherein the training is performed using supervised learning.

In some aspects, the techniques described herein relate to a computer system, wherein the classification model is configured for binary classification.

In some aspects, the techniques described herein relate to a computer system, wherein the binary classifications include a benign classification and a malicious classification.

In some aspects, the techniques described herein relate to a computer system, wherein the third plurality of samples includes the first plurality of samples minus the second plurality of samples.

In some aspects, the techniques described herein relate to a computer system, wherein the fourth plurality of samples is completely different from the second plurality of samples.

In some aspects, the techniques described herein relate to a computer system, wherein the method further includes: selecting a fifth plurality of samples from the training data repository; determining a classification of each sample of the fifth plurality of samples using the classification model; determining for each sample of the fifth plurality of samples, a difference between the determined classification and the known classification; determining, for each sample of the fifth plurality of samples, a second selection weighting; selecting, from the fifth plurality of samples, a sixth plurality of samples, wherein a selection probability is based on the determined selection weighting; and training the classification model using a third plurality of feature vectors associated with the sixth plurality of samples, wherein the training is performed using supervised learning.

In some aspects, the techniques described herein relate to a computer system, wherein the fifth plurality of samples includes the first plurality of samples minus the second plurality of samples and minus the fourth plurality of samples.

In some aspects, the techniques described herein relate to a computer system, wherein the samples include executable files.

In some aspects, the techniques described herein relate to a computer system, wherein the method further includes: determining a first performance characteristic of the model after training the model using the first plurality of feature vectors; determining a second performance characteristic of the model after training the model using the second plurality of feature vectors; comparing the first performance characteristic to the second performance characteristic; and determining, based on the comparison, that the first performance characteristic differs from the second performance characteristic by less than a threshold amount.

In some aspects, the techniques described herein relate to a computer-readable medium storing instructions that, when executed by a computer, cause the computer to perform a method including: selecting, from a training data repository, an initial training dataset, wherein the training data repository includes a first plurality of samples, wherein the initial training dataset includes a second plurality of samples selected from the first plurality of samples, wherein each sample of the first plurality of samples includes a known classification; providing, as an input to a classification model, a first plurality of feature vectors associated with the initial training dataset; training, using the first plurality of feature vectors, the classification model, wherein the training is performed using supervised learning; selecting a third plurality of samples from the training data repository; determining a classification of each sample of the third plurality of samples using the classification model; determining, for each sample of the third plurality of samples, a difference between the determined classification and the known classification; determining, for each sample of the third plurality of samples, a selection weighting, the selection weighting based on the difference between the determined classification and the known classification; selecting, from the third plurality of samples, a fourth plurality of samples, wherein a selection probability is based on the determined selection weighting; and training the classification model using a second plurality of feature vectors associated with the fourth plurality of samples, wherein the training is performed using supervised learning, wherein the fourth plurality of samples is completely different from the second set of samples.

In some aspects, the techniques described herein relate to a computer-readable medium, wherein the method further includes: selecting a fifth plurality of samples from the training data repository; determining a classification of each sample of the fifth plurality of samples using the classification model; determining for each sample of the fifth plurality of samples, a difference between the determined classification and the known classification; determining, for each sample of the fifth plurality of samples, a second selection weighting; selecting, from the fifth plurality of samples, a sixth plurality of samples, wherein a selection probability is based on the determined selection weighting; and training the classification model using a third plurality of feature vectors associated with the sixth plurality of samples, wherein the training is performed using supervised learning.

BRIEF DESCRIPTION OF THE DRAWINGS

The drawings are provided to illustrate example embodiments and are not intended to limit the scope of the disclosure. A better understanding of the systems and methods described herein will be appreciated upon reference to the following description in conjunction with the accompanying drawings, wherein:

FIG. 1 illustrates an example process for training a machine learning model according to some embodiments.

FIG. 3 is a flowchart that illustrates an example process for selecting additional samples for use in training a machine learning model according to some embodiments.

FIG. 6 is a flowchart of an example method for iterative, zero knowledge machine learning model training according to some embodiments.

DETAILED DESCRIPTION

Figure 2:
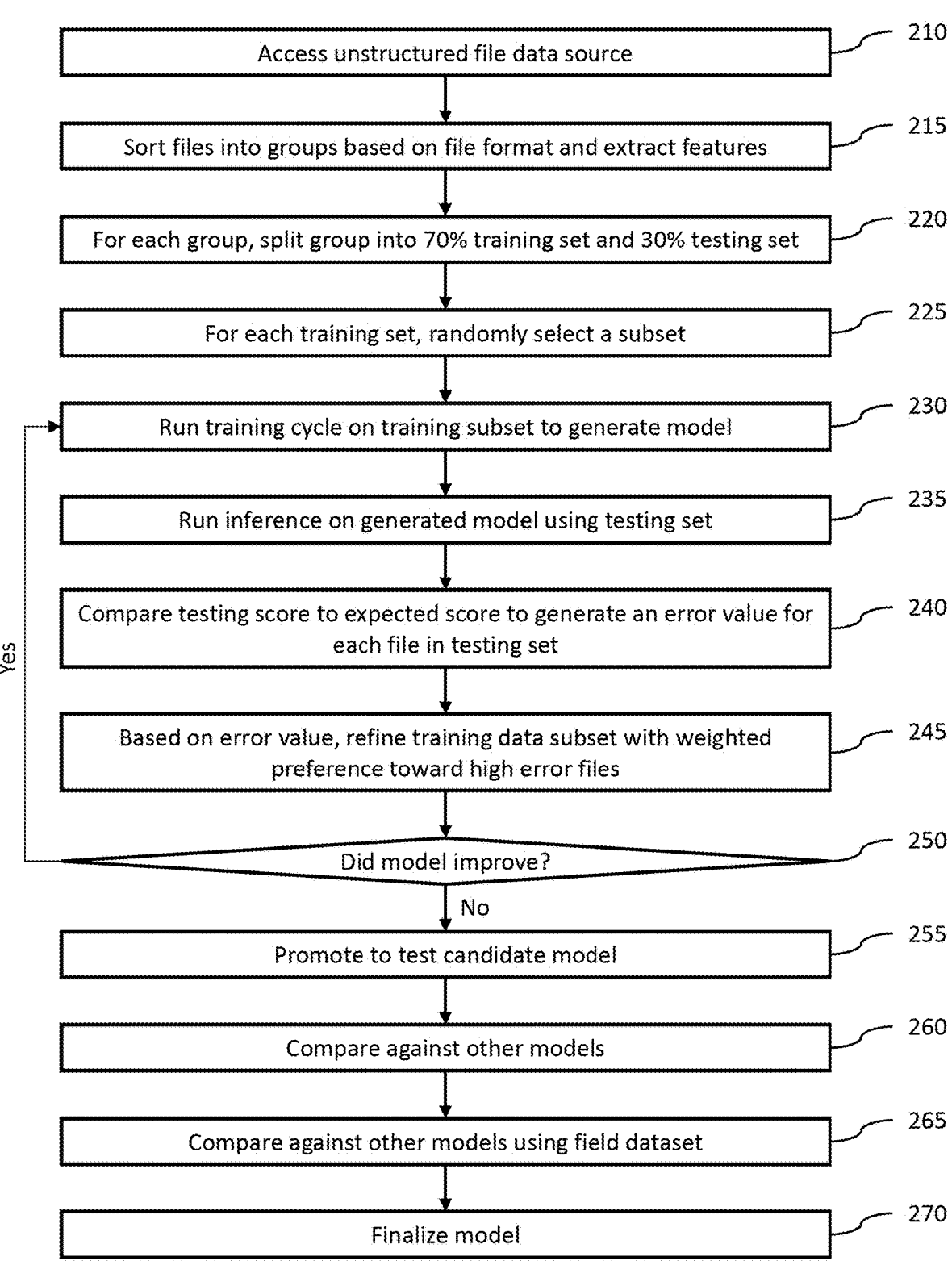
FIG. 2 is a flowchart of an example method for training a machine learning model according to some embodiments.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are necessarily order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present technology is defined solely by the claims. The features illustrated or described in connection with one exemplary embodiment may be combined with the features of other embodiments. Such modifications and variations are intended to be included within the scope of the present technology.

As used herein, the term malware may include, for example and without limitation, any type of malicious software and/or files that include malicious software. Malicious software can include, for example and without limitation any software or code designed to disrupt the operation of a computer system, network, etc., and/or to gain unauthorized access to a computer system, network, etc. Malware can include, for example and without limitation, computer viruses, worms, trojans, ransomware, spyware, adware, wipers, keyloggers, rogue security software (e.g., software designed to mislead users into believing other malware is present on their computers), and so forth.

The terms "model," "machine learning model," and similar terminology as used herein can refer to a construct that can be trained using training data to make predictions and/or to provide probabilities related to new data, which may or may not have been included in the training data. Supervised learning can refer to model training in which samples (e.g., executable files, PDFs, documents, spreadsheets, videos, images, audio files, etc.) have various features and assigned classifications. A new sample can have features that can be used to assign a classification to the new sample. As an example, a model can be trained to identify a likelihood that a file contains malware after being trained using training data that comprises benign and malicious files. Models can include, for example and without limitations, neural networks, decision trees, boosted decision trees, clustering models, decision tree forests, support vector machines, and others known to those of skill in the art.

A model can comprise a plurality of model weights, and training can modify the values of the model weights to produce a model that can make predictions related to new samples, such as unknown files that may or may not include malicious code.

Conventionally, large volumes of unstructured threat data are used to train malware detection models. Generally, using larger volumes of threat data can result in a more accurate model, though this is not necessarily the case, as will be described in more detail herein. There can be significant drawbacks to generating models using large volumes of unstructured threat data, including, for example and without limitation, scalability and/or model bias. Model bias can be considered a systematic error that occurs within a machine learning model due to issues in the training process, such as the use of unbalanced training data. In some implementations, bias can be defined as the error between average model prediction and the truth. In some implementations, bias can describe how well the model characterizes data. For example, a model may characterize the training data well, but may exhibit bias when applied to other data. For example, a model trained to identify pets in images that was trained using only images of cats and dogs would be expected to perform poorly when presented with images that feature other pets, such as rabbits and fish. In some cases, a model may be over-fitted, such that it produces highly accurate results when training data is used as an input to the trained model, but the model produces relatively poor results when presented with new data.

The systems and methods described herein can provide alternatives to using very large volumes of unstructured threat data by using a representative dataset or multiple representative datasets created based at least in part on model outputs to efficiently train malware detection models. Although described below with respect to classifying files, scripts, etc., as benign or malicious, it will be appreciated that the approaches described herein can be applied to a variety of classification problems. The approaches described herein may be of particular utility when classifying inputs (e.g., files, images, etc.) into a small number of classes, such as two classes (e.g., binary classification), three classes, or four classes, although the approaches described herein may nonetheless provide benefits even when the number of possible classes is large.

There can be significant challenges with utilizing a representative dataset selected from a larger set of possible training data. For example, malware may be clustered into various groups that share common code, attack vectors, etc., but there may not be prior knowledge of this clustering. Thus, it can be difficult to select a representative set of samples that can adequately represent the various clusters when training a machine learning model. For example, some clusters may be omitted when selecting a set of samples for training the machine learning model.

As an alternative to utilizing a representative dataset, models can be trained using full datasets. However, this can be undesirable due to cost, time, scaling, and/or other concerns. For example, using full datasets, the data used for training may not fit on a single machine. For example, a single machine may lack insufficient volatile memory, non-volatile memory, or both. Training and/or retraining a model using very large datasets can be increasingly resource-intensive over time. For example, the size of a dataset can grow significantly over time. For example, a dataset of benign and malicious files for training a machine learning model for malware detection may grow by, for example, several million files per week. Thus, over time, it can become increasingly costly and resource-intensive to train a model. In some cases, graphical processing units (GPUs) or other specialized computing hardware may be used in machine learning model training. The cost of GPUs can become prohibitive for large datasets. In some cases, computers used for model training may have limited expansion slots to accommodate GPUs, limited bandwidth to allocate among expansion slots, etc. In some cases, if the dataset grows large enough, it may not be feasible to train a machine learning model using the full dataset or even a large portion of the dataset. For example, the amount of computing resources required may be prohibitively expensive, and/or the time to train the model may be measured in weeks, months, or even years, by which time the model may be outdated as new threats may have emerged. In some cases, a model may be trained on multiple machines, each machine training the model using a subset of an entire dataset, and the results of multiple trainings may be combined to produce a final model. However, a model produced using such an approach may not perform as well as a model that is trained on a single machine using the entire dataset.

According to some embodiments herein, the clustering of samples (e.g., clustering of malware) can be utilized to efficiently train a malware detection model without a need to have knowledge of the clusters themselves. As described herein, an iterative, zero-knowledge training approach can be used to train a machine learning model to identify malware using a small fraction of available samples. In some embodiments, a representative dataset (e.g., a dataset that represents all or substantially all clusters in an entire dataset) can be constructed using the approaches described herein.

For some types of data, such as clustered data, the number of samples from a dataset that are used to train a model (e.g., a classification model) can be significantly reduced. For example, an initial dataset for model training may comprise 0.01%, 0.1%, 1%, or 10%, or any value between these values, or more or less, of the full dataset. It will be appreciated that the size of the initial training dataset in relation to the size of the full dataset may depend on the size of the full dataset, the structure of the data within the dataset, number of features, the desired output of the model, and/or the like. For example, as described herein, for a full dataset comprising hundreds of millions of files, an initial dataset may include, for example, about 100,000 files, about 300, 000 files, about 500,000 files, etc.

In some embodiments, an iterative training approach may be used to train a machine learning model. For example, starting from an initial dataset, additional samples from the full dataset may be selected during each iteration of training. For example, starting from an initial dataset of 300,000 samples, during each training iteration, additional samples can be selected, for example 10,000 samples, per iteration. The size of the initial dataset and the number of samples selected for each iteration is not necessarily limited and can be any suitable values. In some embodiments, the final dataset used for training may comprise about 500,000 samples. In some embodiments, model weights may be discarding after each training cycle and only model weights from a final training cycle may be maintained.

In some embodiments, clustering can reduce model skew that can occur due to over-representation of specific malware, families of malware, etc. In some embodiments, models can be benchmarked against one another to determine relative model performance. In some embodiments, training may be completed with zero knowledge. Zero knowledge can mean, for example, that the clustering is not pre-defined. Instead, in some embodiments, clustering can emerge through similar malware attributes. In some embodiments, zero knowledge can mean that model weights are not retained from one training iteration to another.

As discussed above, in some cases, it may not be feasible to train a model using a full training dataset. However, even in circumstances where training using a full training dataset is feasible, doing so may be undesirable for other reasons. For example, full datasets may introduce bias into malware detection models because, for example, a full dataset may over-represent certain attack types/vectors. For example, a large outbreak of a particular type of malware may result in a large number of samples of that particular type of malware being present in the full dataset. In some embodiments, full datasets may have fewer benign files due to the nature of data sources in malware databases (e.g., files may only be uploaded to a malware database if the file contains malware). In some embodiments, the systems and methods described herein can reduce such biases, resulting in a more balanced training dataset. Reducing bias in the training dataset can improve the performance of a model, for example reducing the number of false positives and/or false negatives. For example, if a training dataset over-represents malicious files (e.g., malware, such as viruses, trojans, ransomware, etc.), a model trained using the training dataset may be more likely to misidentify a benign file as a malicious file. In some embodiments, the approaches herein may improve the true positive rate and/or the true negative rate (e.g., malware may be correctly identified as malware at a higher rate and/or benign files may be correctly identified as benign files at a higher rate). In some embodiments, a model as trained herein can perform better than a model trained using a full dataset. In some embodiments, a model as trained herein can perform in a manner substantially similar to a model trained using a full data set.

The approaches herein can be applied to a variety of machine learning problems. As described herein, in some embodiments, the approaches described in this disclosure can be used to train models to classify samples (e.g., files) as benign or malicious. In some embodiments, files can be clustered. For example, files can be benign or malicious.

Within malicious files, various clusters may exist. For example, malicious files may be clustered by type of malware, security vulnerabilities used by the malware, code shared by the malware, etc. For example, in some embodiments, malware can be clustered into viruses, trojans, ransomware, adware, keyloggers, crypto miners, etc. In some embodiments, malware may be clustered at a more granular level. For example, ransomware may be clustered by family, such as VirLock, Makop, Ryuk, WanaCryptOr, and so forth. In some embodiments, malware may be clustered by the vulnerability or vulnerabilities that are exploited, such as the Apache Struts2 Remote Code Execution vulnerability, PHPUnit remote code execution vulnerability, Draytek Vigor buffer overflow vulnerabilities, and so forth. In some embodiments, malware may be classified by loader, for example SquirrelWaffle. In some embodiments, clustering can be based on common code shared by malware.

In some embodiments, the clustering may not be known. Advantageously, according to some embodiments, it is not necessary to know the clustering of malicious files in order to select representative samples for a training dataset.

In some embodiments, a model can be trained to determine a likelihood that a file is benign or malicious. For example, a model can be trained to assign a score between 0 and 1 to a file, with 0 indicating a benign file and 1 indicating a malicious file. It will be appreciated that this particular scoring scheme and numerical range is merely an example, and any suitable range may be used consistent with this disclosure. In some embodiments, a training dataset can include a plurality of samples, and each sample can be labeled as benign or malicious, such that training the model can be done in a supervised manner.

In some embodiments, a model may comprise a static malware detection model. The static malware detection model can be used to detect known and/or unknown malware by scanning files and classifying them into one or more categories. For example, in some embodiments, a file can be classified as malware or benign based on the output of the model. In some embodiments, a file having a model output in a first range (e.g., [0-0.5]) may be classified as benign and a file having a model output in a second range (e.g., (0.5-1]) may be classified as malicious. In some embodiments, files can be classified into one or more categories. For example, in some embodiments, a file can be classified as benign, check reputation, suspicious, or malicious. In some embodiments, benign can indicate that the file is safe to run, check reputation can indicate that the file has malicious characteristics, but the file may be benign, suspicious can indicate that the file has a high number of malicious characteristics but may be benign, and malware can indicate that the file has a high number of malicious characteristics and is a threat to a host system. In some embodiments, a file classified as "check reputation" may be allowed to run, be opened, etc. In some embodiments, a file classified as "check reputation" may not be allowed to be opened, run, etc. In some embodiments, a file classified as "check reputation" may undergo further processing or analysis, for example by sending the file or a representation of the file (e.g., a checksum, signature, metadata, etc.) to a cloud server for further analysis. In some embodiments, a file classified as suspicious may be allowed to be run, opened, etc. In some embodiments, a file marked as suspicious may not be allowed to be run, opened, etc. In some embodiments, an agent running on an end-user host system (e.g., a laptop, desktop, tablet, etc.) may be configured to prompt a user prior to allowing a file classified as suspicious and/or check reputation to be opened, run, etc. In some embodiments, an agent can be configured to allow or disallow running, opening, etc., files that are classified as suspicious and/or check reputation. In some embodiments, an agent can be configured to quarantine some files, such as files identified as malicious, suspicious, and/or check reputation.

In some embodiments, a model may support one file type (e.g., executables). In some embodiments, a model may support multiple file types. For example, in some embodiments, a model may support any combination of Portable Executable (PE) files, Executable and Linkable Format (ELF) files, Mach-O files, .Net files, archives and/or compressed archives (e.g., zip files, gzip files, bzip2 files, RAR files, tarballs, etc.), disk images (e.g., ISO files, DMG files, etc.), Office files (e.g., Office files that include VBA script), PDF files, scripts (e.g., JavaScript files, Python files, Ruby files, TypeScript files, shell script files (e.g., Bash scripts, zsh scripts, PowerShell scripts, etc.), PHP files, etc.), and so forth.

In some embodiments, one or more parsers, which may be compiled and/or interpreted applications, scripts, etc., may be used to extract features from files. The extracted features can be used to train a model and/or can be used when scanning a file with a trained model to determine a classification of the file. Features can take on various forms as will be understood by those of skill in the art. Features can include, for example and without limitation, the number of imports, whether an imports table is corrupt, number of valid sections, file entropy, etc. In some embodiments, there can be hundreds or thousands of features. The number of features may depend on, for example, the file type. In some cases, more or fewer features may be selected to achieve desired computational cost, model performance, etc. For example, some features may not be selected because they are poor indicators of the target variable (e.g., whether or not a particular sample is malicious or benign). Some features may not be selected because, while they may be good indicators of the target variable, they are redundant with other features. Excess features may slow down training and/or impact model performance when deployed. In some cases, only some parts of a file may be used for feature extraction. For example, for an Office file that includes VBA code, the VBA code may be of the greatest concern from a security perspective. Thus, in some embodiments, features may be extracted primarily or even exclusively from the VBA code included in the file.

FIG. 1 illustrates an example process for training a machine learning model according to some embodiments. The process illustrated in FIG. 1 can be carried out on a computer system. At step 110, the system can access a training data repository. For example, the system can access a database, data store, or the like that contains a plurality of samples, which may include malware and/or benign files, scripts, etc. At step 115, the system can sort samples into groups based on file format, type (e.g., executable, image, video, etc.), or some other grouping. For example, the process depicted in FIG. 1 may be used to train a machine learning model to determine if ELF executable files contain malware. In such a case, at step 115, the system can select ELF executable files from the samples included in the training data repository. At step 120, the system can extract sample features and parse the features into feature vectors. In some embodiments, the feature vectors can be used for training the machine learning model. At step 125, for each group, the system can select a training dataset and a testing dataset. The training dataset can be used for training the machine learning model, and the testing dataset can be used for testing the machine learning model after training.

In some embodiments, a training dataset can comprise about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100% of the samples in the group. In some embodiments, a testing dataset can comprise the samples in the group that were not included in the training dataset.

At step 130, for each training dataset, the system can randomly select a subset of samples from the training dataset. At step 135, the system can train the model using the training data subset, the training data subset comprising the randomly selected subsets of samples for each training dataset. At step 140, the system can determine a model output (e.g., score) for each sample in testing dataset. At step 145, the system can compare scores for each sample in testing dataset to expected scores for each sample in testing dataset. For example, the unstructured sample data source may include an indication of whether each sample is malicious or benign. The comparison can comprise comparing the model output to the expected value based on the known classification of the sample. For example, a benign file may have an expected value of 0 and the model output may be a value equal to or close to zero (which may indicate that the model correctly identified the file as benign), equal to or close to one (which may indicate that model incorrectly identified the file as malicious), or in a middle region between zero and one, which may indicate that the model failed to make a strong prediction of whether the file is malicious or benign. At step 150, the system can select additional samples to the training data subset based on the comparison. At step 155, the system can train the model using the updated subset. In some embodiments, the system may retain model weights from the previous training In some embodiments, the system may not retain model weights from the previous training.

FIG. 2 is a flowchart of an example method for training a machine learning model according to some embodiments. The method shown in FIG. 2 can be performed on a computer system.

At step 210, the system can access an unstructured file data source or training data store. At step 215, the system can sort files into groups based on file format and extract features. At step 220, the system can, for each group, split the group into a training set comprising, for example, 70% of the data, and a testing set comprising, for example, 30% of the data. At step 225, the system can, for each training set, randomly select a subset. At step 230, the system can run a training cycle on training subset to generate a model. At step 235, the system can run inference on the generated model using testing set to generate a testing score for each file in the testing set. At step 240, the system can compare the testing score to the expected score or true score to generate an error value for each file in the testing set. At step 245, the system can, based on the error values, refine training data subset with weighted preference toward high error files. At decision point 250, the system can determine if the model improved. For example, the system can determine if the model performance improved by more than a threshold amount. As described herein, a performance improvement can include any combination of measures of false positive rates, false negative rates, true positive rates, true negative rates, and/or the like. If so, the system can proceed to step 230 and perform additional training. If not, the system can stop training the model. At step 255, the system can promote the model to a test candidate model. At step 260, the system can compare the test candidate model against other models, for example against a production model, other test candidate models, etc. At step 265, the system can compare against other models using a field dataset. For example, the model may be tested against other models using current data to determine how the model performs against a currently-deployed model. At step 270, the system can finalize the model. For example, the system can select a final model for use in production.

FIG. 3 is a flowchart that illustrates an example process for selecting additional samples for use in training a machine learning model according to some embodiments. The process depicted in FIG. 3 can be performed on a computer system. At step 310, the system can use a trained model (e.g., a model that has undergone an initial training using a random subset of samples, for example as described above) to run inference on a full training dataset. For example, if a full training dataset comprises 1 million samples and the random subset includes 1,000 samples, the system can run inference on the full training set. In some embodiments, the system may run inference on the full training set except for the random subset, whose model outputs may already be known (e.g., as a result of the training process). Running inference can produce a model output score for each sample, for example a value between 0 and 1, with 0 indicating that the sample is benign and 1 indicating that the sample is malicious. At step 320, the system can determine a difference between the model output score and the true score (e.g., 0 for benign samples and 1 for malicious samples). For example, the system can determine the absolute value of the difference between the model output score and the true score. In some embodiments, it can be assumed that a greater difference between a sample's model output score and its true score indicates a higher likelihood that a cluster to which the sample belongs was not included in the data used to train the model or that an insufficient number of samples from the cluster were included in the data used to trained the model. As step 330, the system can assign a weight to each previously unselected sample based on the difference between the model output score and the true score. At step 340, the system can select additional samples for use in training the model. Each sample can have associated therewith a selection probability or selection weight. The selection weight can be proportional to the difference between the model output score and the true score as determined at step 320. For example, if the model incorrectly determined that a sample was malicious or benign, that sample can have a relatively high probability of being selected for inclusion in a training dataset for subsequent training iterations. If the model correctly determined that a sample was malicious or benign, that sample can have a relatively low probability of being selected for inclusion in subsequent training iterations. At step 350, the system can train the model again using an updated training dataset, where the updated training set includes the previously-selected samples and the additional samples selected at step 340.

Figure 4:
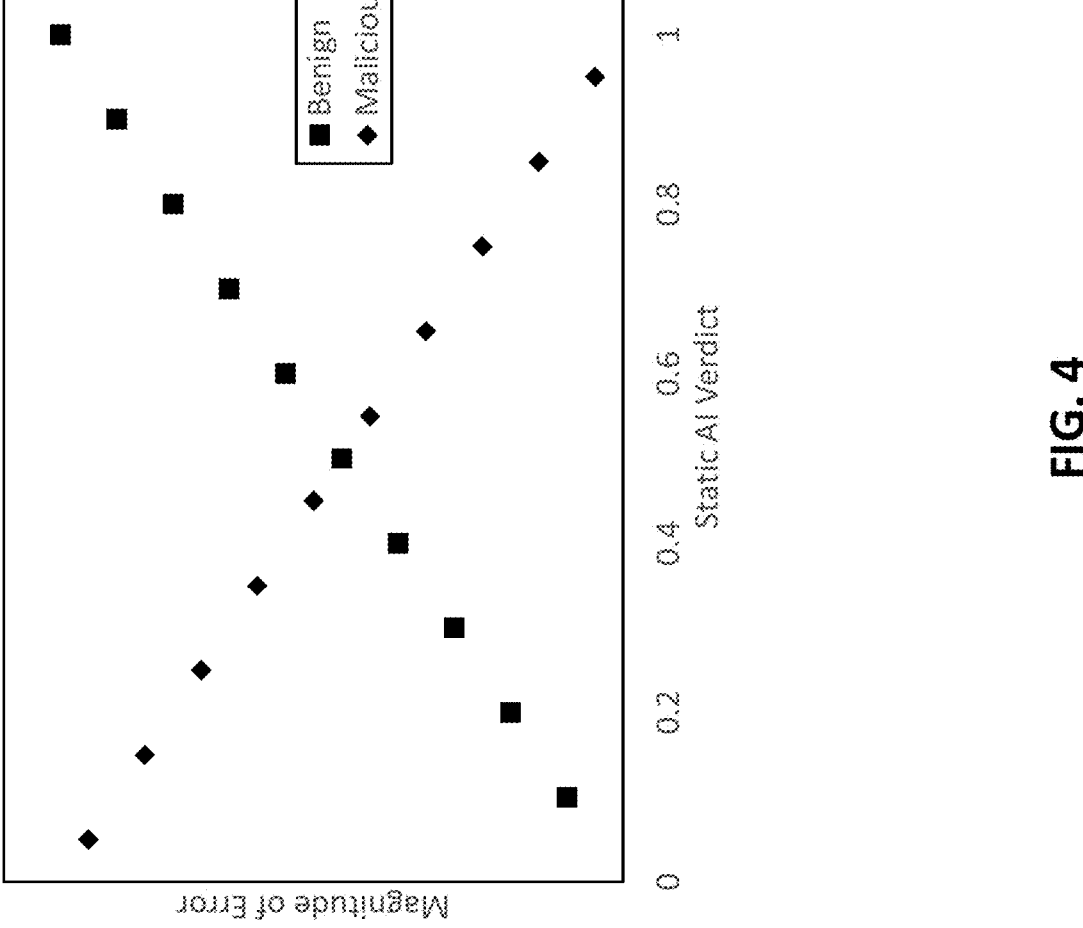
FIG. 4 is an example chart that indicates the error in a model score as a function of model score for benign and malicious files.

FIG. 4 is a chart that indicates the error in a model score as a function of model score for benign and malicious files. In FIG. 4, the model output is labeled "Static AI Verdict" along the horizontal axis.

Figure 5:
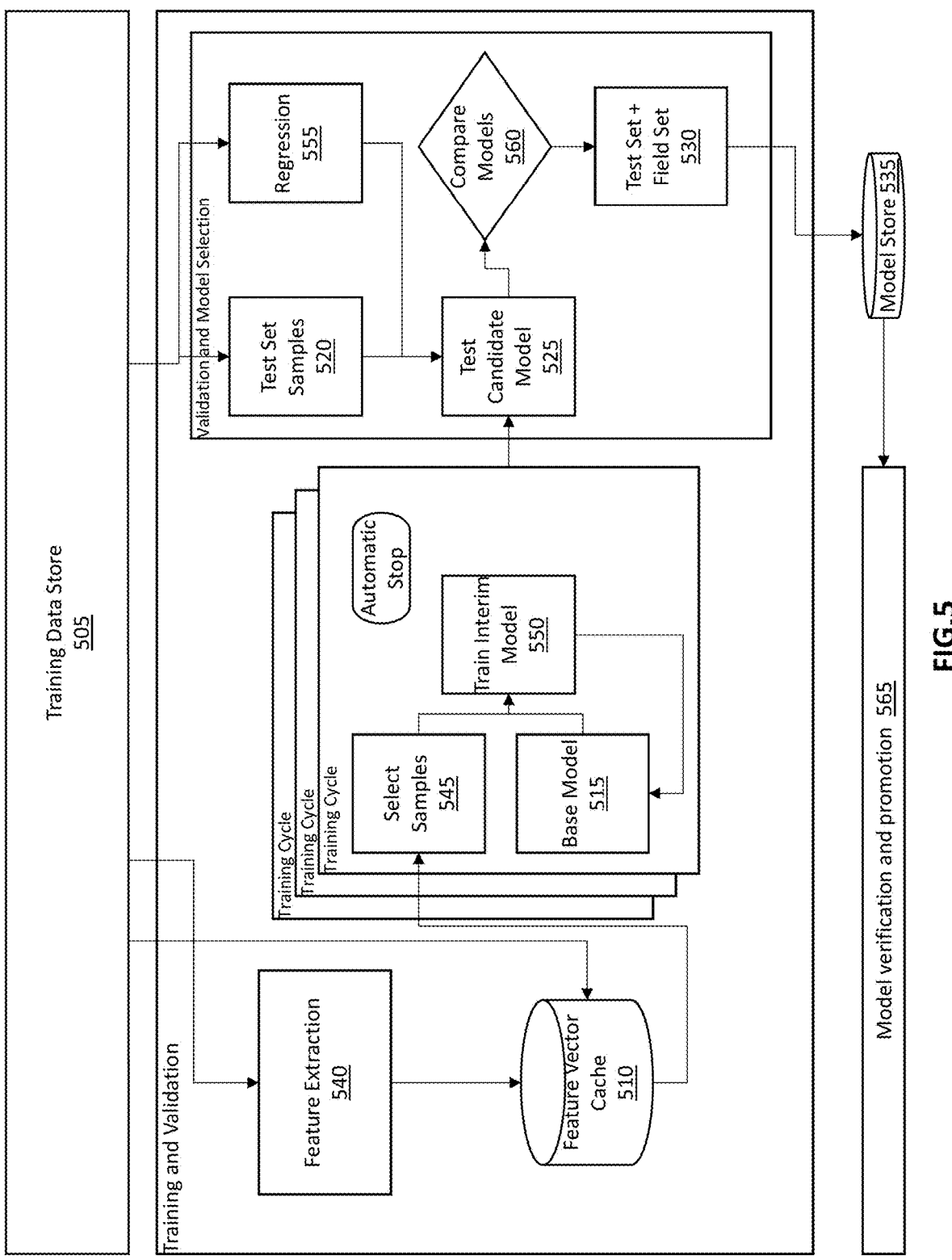
FIG. 5 is a flowchart that illustrates another training process according to some embodiments that can be performed on a computer system.

FIG. 5 is a flowchart that illustrates another training process according to some embodiments that can be performed on a computer system. In FIG. 5, a training data store 505 can contain a plurality of samples, for example files. In some embodiments, each sample can be labeled or classified as benign or malicious. At step 540, the system can extract features and store the features in a feature vector cache 510. During a training cycle, the system can select samples at step

545, which can be used to train an interim model at block 550 based on a base model 515. The base model 515 can be a model that has default or starting values for the one or more model weights of the model. In some embodiments, the training cycle can automatically stop upon reaching a stop condition, such as a lack of continued improvement in the model above a threshold amount, a maximum number of training cycles being reached, etc. The training can produce a test candidate model 525. During a validation and model selection phase, test set samples 520 can be selected from the training data store 505. The test candidate model 525 can be used to perform regression 555. At decision point 560, the system can compare the test candidate model 525 to one or more other models in the model store 535. In some embodiments, comparisons can be performed using a test set and field set 530. At block 565, the system can perform model verification and promotion. For example, a test candidate model can be promoted to production use. In some embodiments, a new model may perform better than an old model in some aspects but may perform worse than an old model in other aspects. For example, a new model may be better at detecting one type of malware and worse at detecting another type of malware. Thus, it can be important to test a new model against old models to ensure that any regressions are acceptable.

FIG. 6 is a flowchart of an example method for iterative, zero knowledge machine learning model training according to some embodiments. The method depicted in FIG. 6 can be carried out on a computer system.

At step 610, the method can include selecting, from a training data repository, an initial training dataset, wherein the training data repository comprises a first plurality of samples, wherein the initial training dataset comprises a second plurality of samples selected from the first plurality of samples. The second plurality of samples can be, for example, a randomly selected set of samples chosen from the training data repository.

At step 620, the method can include providing, as an input to the classification model, a first plurality of feature vectors associated with the initial training dataset. For example, in some embodiments, a parser application can extract features from the samples in the initial training dataset. In some embodiments, the extracted features can be used to construct feature vectors. In some embodiments, feature extraction and/or feature vector construction can take place on the same machine and/or proximate in time to the training of the classification model. In some embodiments, the feature extraction and/or feature vector construction may take place on a different system and/or at a time that is not proximate to the training time. For example, in some embodiments, a system that stores data in the training data repository can be configured to extract features and/or construct feature vectors as samples are added to the training data depository, on an on-demand basis, and/or on a scheduled basis.

At step 630, the method can include training, using the first plurality of feature vectors, the classification model, wherein the training is performed using supervised learning. For example, in a model used for malware identification, the model can be trained to classify samples as benign or malicious. For example, each sample can have a true classification (e.g., malicious or benign) that is already known.

At step 640, the method can include selecting a third plurality of samples from the training data repository. For example, the third plurality of samples can be all the samples in the training data repository that were not included in the initial training dataset. In some embodiments, fewer samples may be included. For example, selecting fewer samples may reduce computational time and/or resource usage. However, selecting fewer samples may result in a model that does not perform as well after the iterative training process is complete. Moreover, compared to training, performing inference using the classification may use significantly fewer computational resources. Thus, it can be advantageous to perform inference on an entire data set, which can help ensure that all clusters are represented in training data.

At step 650, the method can include determining a classification of each sample of the third plurality of samples using the classification model. For example, the system can provide feature vectors for each sample of the third plurality of samples to the classification model. The model can output a determination of the classification of each sample of the third plurality of samples. For example, in the context of malware detection, the classification model can output a value between 0 and 1, where 0 indicates a benign file and 1 indicates a malicious file.

At step 660, the method can include determining, for each sample of the third plurality of samples, a difference between the determined classification and a known classification. For example, if a determined classification is 0.75 and the file is malicious (e.g., the known classification value is 1), the difference can be, for example, $D=abs($determined value−true value$)$ (e.g., $D=abs(0.75-1)=0.25$), where $abs()$ indicates an absolute value function. In some embodiments, the absolute value may not be taken or may be taken in a different step.

At step 670, the method can include determining, for each sample of the third plurality of samples, a selection weighting, the selection weighting based on the difference between the determined classification and the known classification. For example, each sample in the third plurality of samples can be weighted according to the difference D between the determined classification and the true classification. For example, if the determined classification for a sample is close to the true classification (e.g., D is close to zero), the sample can have a low selection weighting. If the determined classification for the sample is far from the true classification (e.g., D is close to one), the sample can have a high selection weighting. Samples with higher selection weighted can have a higher probability of being selected for use in training the classification model than samples with relatively low selection weighting. In some embodiments, if the difference D is below a threshold value, the selection weighting can be set to zero, such that the sample is not selected in subsequent steps. In some embodiments, if the difference D is below a threshold value, the selection weighting can be set to a fixed value greater than zero, such that there is a low, but non-zero, probability that the sample will be selected in subsequent steps.

At step 680, the method can include selecting, from the third plurality of samples, a fourth plurality of samples, wherein a selection probability is based on the determined selection weighting. In some embodiments, the selection probability may be similar to or the same as the selection weighting. In some embodiments, the selection probability may be computed from the selection weighting (e.g., may be a function of the selection weighting).

At step 690, the method can include training the classification model using a second plurality of feature vectors associated with the fourth plurality of samples and the first plurality of feature vectors associated with the second plurality of samples, wherein the training is performed using supervised learning. For example, as described above, the samples can have a known, true classification of benign or malicious in the context of malware classification.

The process described above with reference to FIG. 6 and/or a similar process can be carried out in an iterative manner, with each iteration adding more samples to be used for training. The iterative process can continue until a stop condition is met. The stop condition can be, for example, a maximum number of iterations, a maximum training sample size, a minimum change in model performance, and/or the like.

Figure 7:
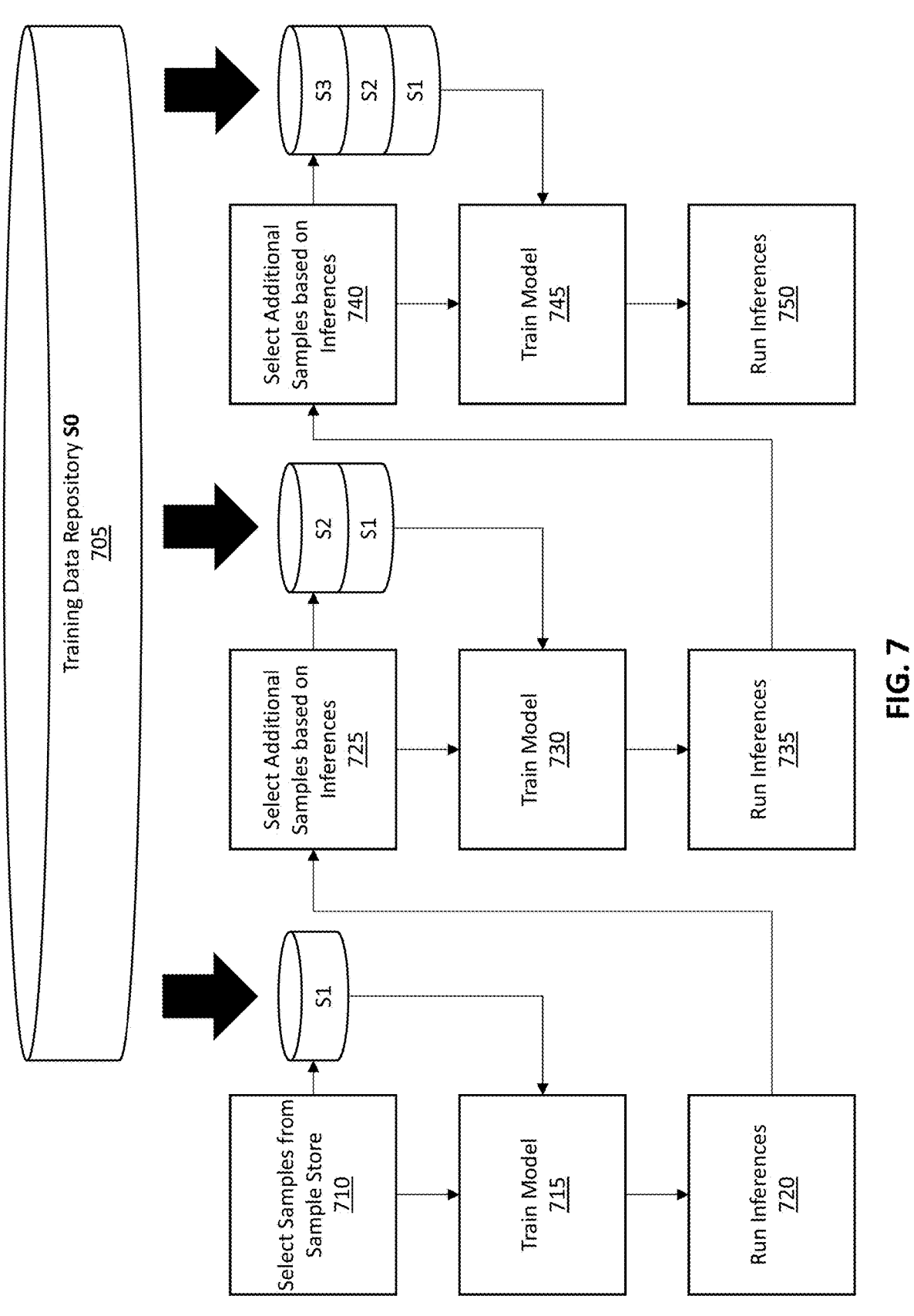
FIG. 7 illustrates an example sample selection and training process according to some embodiments.

FIG. 7 illustrates an example sample selection and training process according to some embodiments. The process illustrated in FIG. 7 can be performed on a computer system. At step 710, the system can select samples from the training data repository 705 (also referred to herein as a sample store). The set of all samples in the training data repository 705 can be labeled S0. The selected samples are indicated as the set S1 in FIG. 7. The set S1 can be randomly selected from the training data repository 705. At step 715, the system can train a classification model using the set S1 as a training dataset. At step 720, the system can use the trained classification model to run inferences. In some embodiments, inferences can be run on the set S0-S1 (e.g., all the samples in the training data repository 705 that were not used for training the model at step 715). At step 725, the system can select additional samples, denoted S2, from the training data repository 705 based on the inferences at step 720. For example, as described above, samples that were misclassified at step 720 can have a higher probability of being selected at step 725 and included in the set S2 than samples that were correctly classified at step 720. At step 730, the system can train the classification model using a combined training set that includes S1 and S2. In some embodiments, the training at step 730 may not begin with the model weights determined at step 715. At step 735, the system can run inferences. For example, in some embodiments, the system can run inferences on the set S0-S1-S2. At step 740, the system can select additional samples based on the inferences at step 735, for example as described with respect to step 725. The additional samples are labeled as S3 in FIG. 7. At step 745, the system can train the classification model using a combined training dataset that includes S1, S2, and S3. In some embodiments, the training at step 745 may not start with the model weights determined at step 730 or at step 715. At step 750, the system can run inferences using the model trained at step 745 on the dataset S0-S1-S2-S3.

Additional selection, training, and inference steps may be included in a model training process consistent with that described above and illustrated in FIG. 7. For example, there may be about 2, about 3, about 4, about 5, about 6, about 7, about 8, about 9, about 10, about 15, about 20, about 25, about 30, or more iterations.

Various techniques for machine learning model training can be used to train a classification model. In some embodiments, training may be carried out using a gradient boosting library. For example, in some embodiments, a library such as XGBoost can be used.

In some embodiments, a resulting model can be a forest of decision trees (e.g., boosted trees) that may be serialized, packaged with one or more parsers, and delivered to a Windows, Linux, macOS, and/or storage agents. In some embodiments, an agent can be a software application or module that runs on a computer system. In some embodiments, the agent can be used to apply a trained machine learning model to data (e.g., files) present on a computer system and/or on a machine to which the computer system is connected (e.g., network attached storage, cloud storage, etc.).

Machine Learning

Figure 8:
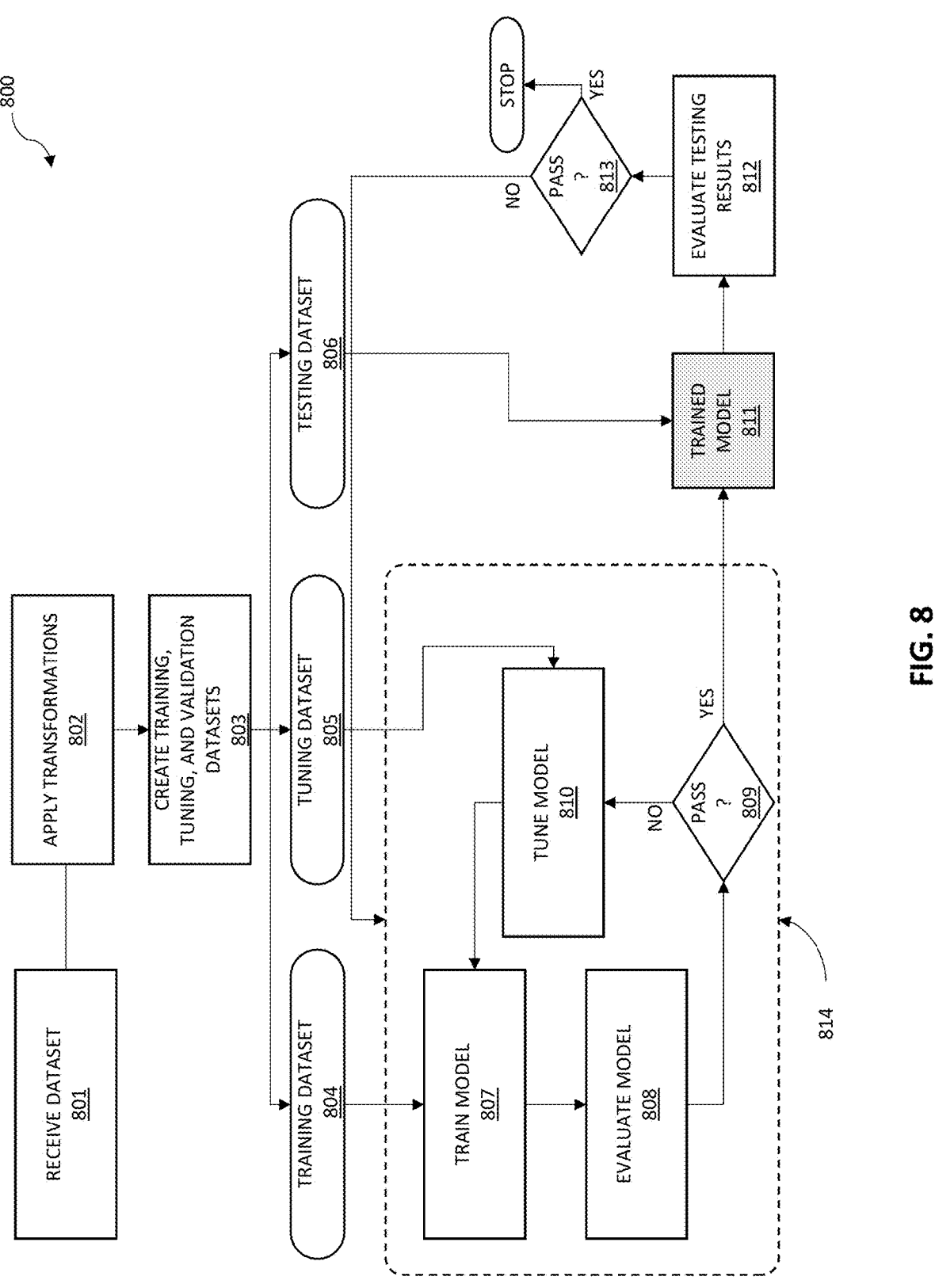
FIG. 8 depicts a process for training an artificial intelligence or machine learning model according to some embodiments.

FIG. 8 depicts a process for training an artificial intelligence or machine learning model according to some embodiments. The process 800 can be run on a computing system. At block 801, the system may access or receive a dataset. The dataset may include a plurality of samples, such as executable files, scripts, spreadsheets, documents, presentations, PDF files, audio files, video files, image files, etc. In some embodiments, the samples can be classified or labeled. For example, each sample may be classified as benign or malicious. At block 802, the samples can be parsed. Parsing can include, for example, extracting strings, extracting code, extracting metadata, etc. In some embodiments, one or more transformations can be applied to the extracted data. For example, data may require transformations to conform to expected input formats, for example to conform with expected date and/or time formatting. Strings and/or other information may be modified prior to use in machine learning training For example, categorical data may be encoded in a particular manner Nominal data may be encoded using one-hot encoding, binary encoding, feature hashing, or other suitable encoding methods. Ordinal data may be encoded using ordinal encoding, polynomial encoding, Helmert encoding, and so forth. Numerical data may be normalized, for example by scaling data to a maximum of 1 and a minimum of 0 or −1. These are merely examples, and the skilled artisan will readily appreciate that other transformations are possible. At block 803, the system may create, from the received dataset, training, tuning, and testing/validation datasets. The training dataset 804 may be used during training to determine features for forming a predictive model. The tuning dataset 805 may be used to select final models and to prevent or correct overfitting that may occur during training with the training dataset 804, as the trained model should be generally applicable to a broad range of input data, not merely to data used for model training. The testing dataset 806 may be used after training and tuning to evaluate the model. For example, the testing dataset 806 may be used to check if the model is overfitted to the training dataset. The system, in training loop 814, may train the model at block 807 using the training dataset 804. Training may be conducted in a supervised, unsupervised, or partially supervised manner According to various embodiments herein, the classification models herein can be trained in a supervised manner. At 808, the system may evaluate the model according to one or more evaluation criteria. For example, the evaluation may include determining a false positive rate, false negative rate, true positive rate, true negative rate, and/or other metrics. At decision point 809, the system may determine if the model meets the one or more evaluation criteria. If the model fails evaluation, the system may, at 810, tune the model using the tuning dataset 805, repeating the training block 807 and evaluation 808 until the model passes the evaluation at decision point 809. Once the model passes the evaluation at 809, the system may exit the model training loop 814. The testing dataset 806 may be run through the trained model 811 and, at block 812, the system may evaluate the results. If the evaluation fails, at block 813, the system may reenter training loop 814 for additional training and tuning. If the model passes, the system may stop the training process, resulting in a trained model 811. In some embodiments, the training process may be modified. For example, the system may not use a tuning dataset 805. In some embodiments, the model may not use a testing dataset 806.

While the process depicted in FIG. 8 illustrates a more conventional approach to machine learning training, concepts from the process depicted in FIG. 8 may be used in training a machine learning model in various embodiments according to the present disclosure. For example, during iterative, zero-knowledge training as described herein, the training process can involve model evaluation and tuning.

Computer Systems

Figure 9:
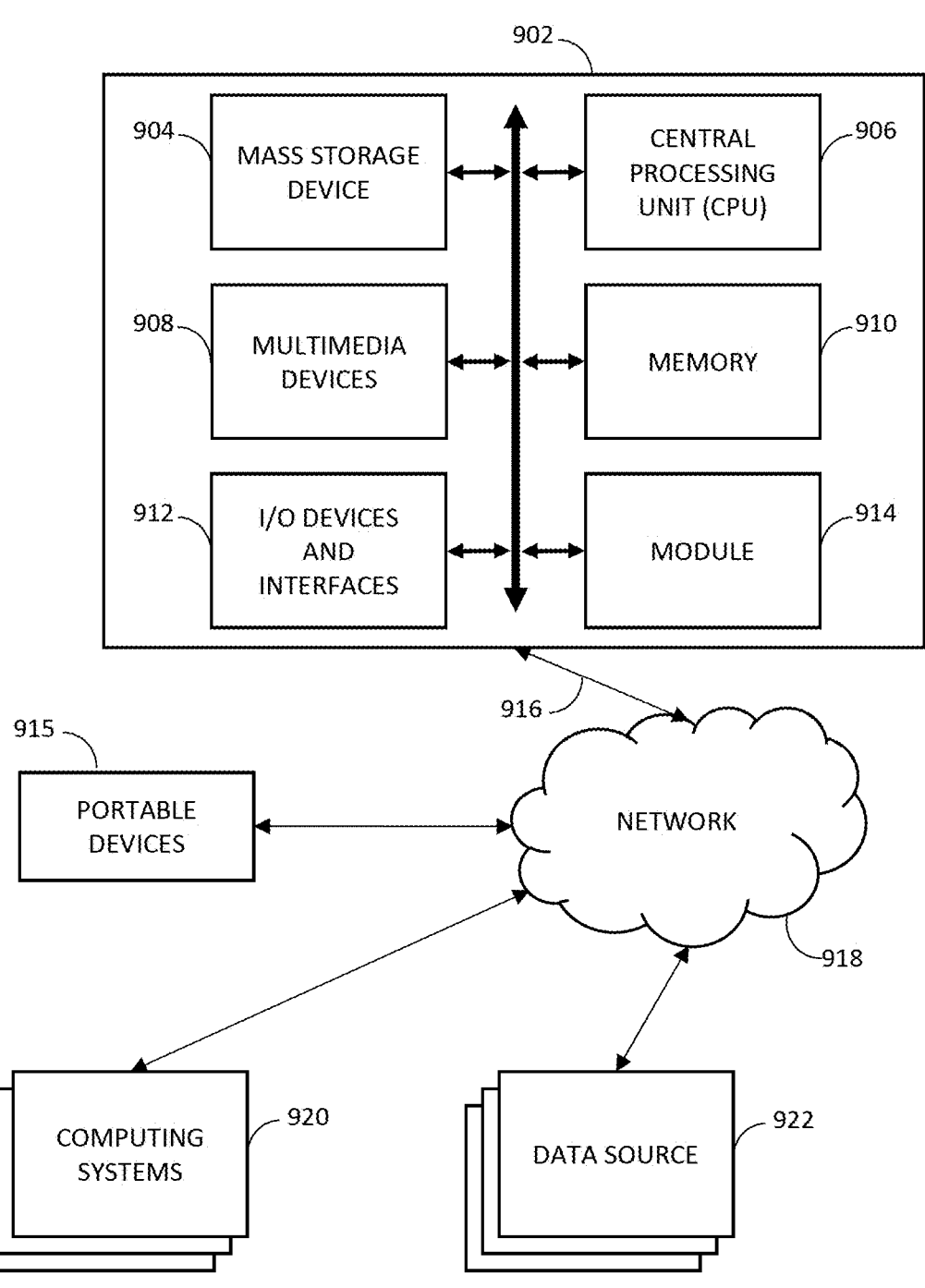
FIG. 9 is a block diagram depicting an embodiment of a computer hardware system configured to run software for implementing one or more embodiments disclosed herein.

FIG. 9 is a block diagram depicting an embodiment of a computer hardware system configured to nm software for implementing one or more embodiments disclosed herein.

In some embodiments, the systems, processes, and methods described herein are implemented using a computing system, such as the one illustrated in FIG. 9. The example computer system 902 is in communication with one or more computing systems 920 and/or one or more data sources 922 via one or more networks 918. While FIG. 9 illustrates an embodiment of a computing system 902, it is recognized that the functionality provided for in the components and modules of computer system 902 may be combined into fewer components and modules, or further separated into additional components and modules.

The computer system 902 can comprise an iterative training module 914 that carries out the functions, methods, acts, and/or processes described herein. The iterative training module 914 is executed on the computer system 902 by a central processing unit 906 discussed further below.

In general, the word "module," as used herein, refers to logic embodied in hardware or firmware or to a collection of software instructions, having entry and exit points. Modules are written in a program language, such as JAVA, C or C++, Python, or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 902 includes one or more processing units (CPU) 906, which may comprise a microprocessor. The computer system 902 further includes a physical memory 910, such as random-access memory (RAM) for temporary storage of information, a read only memory (ROM) for permanent storage of information, and a mass storage device 904, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 902 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 902 includes one or more input/output (I/O) devices and interfaces 912, such as a keyboard, mouse, touch pad, and printer. The I/O devices and interfaces 912 can include one or more display devices, such as a monitor, which allows the visual presentation of data to a user. More particularly, a display device provides for the presentation of GUIs as application software data, and multi-media presentations, for example. The I/O devices and interfaces 912 can also provide a communications interface to various external devices. The computer system 902 may comprise one or more multi-media devices 908, such as speakers, video cards, graphics accelerators, and microphones, for example.

The computer system 902 may run on a variety of computing devices, such as a server, a Windows server, a Structure Query Language server, a Unix Server, a personal computer, a laptop computer, and so forth. In other embodiments, the computer system 902 may run on a cluster computer system, a mainframe computer system and/or other computing system suitable for controlling and/or communicating with large databases, performing high volume transaction processing, and generating reports from large databases. The computing system 902 is generally controlled and coordinated by an operating system software, such as Windows XP, Windows Vista, Windows 7, Windows 9, Windows 10, Windows 11, Windows Server, Unix, Linux (and its variants such as Debian, Linux Mint, Fedora, and Red Hat), SunOS, Solaris, Blackberry OS, z/OS, iOS, macOS, or other operating systems, including proprietary operating systems. Operating systems control and schedule computer processes for execution, perform memory management, provide file system, networking, and I/O services, and provide a user interface, such as a graphical user interface (GUI), among other things.

The computer system 902 illustrated in FIG. 9 is coupled to a network 918, such as a LAN, WAN, or the Internet via a communication link 916 (wired, wireless, or a combination thereof). Network 918 communicates with various computing devices and/or other electronic devices. Network 918 is communicating with one or more computing systems 920 and one or more data sources 922. The iterative training module 914 may access or may be accessed by computing systems 920 and/or data sources 922 through a web-enabled user access point. Connections may be a direct physical connection, a virtual connection, and other connection type. The web-enabled user access point may comprise a browser module that uses text, graphics, audio, video, and other media to present data and to allow interaction with data via the network 918.

Access to the iterative training module 914 of the computer system 902 by computing systems 920 and/or by data sources 922 may be through a web-enabled user access point such as the computing systems' 920 or data source's 922 personal computer, cellular phone, smartphone, laptop, tablet computer, e-reader device, audio player, or another device capable of connecting to the network 918. Such a device may have a browser module that is implemented as a module that uses text, graphics, audio, video, and other media to present data and to allow interaction with data via the network 918.

The output module may be implemented as a combination of an all-points addressable display such as a cathode ray tube (CRT), a liquid crystal display (LCD), a plasma display, or other types and/or combinations of displays. The output module may be implemented to communicate with input devices 912 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 902 may comprise a physical or logical connection established between a remote microprocessor and a mainframe host computer for the express purpose of uploading, downloading, or viewing interactive data and databases online in real time. The remote microprocessor may be operated by an entity operating the computer system 902, including the client server systems or the main server system, an/or may be operated by one or more of the data sources 922 and/or one or more of the computing systems 920. In some embodiments, terminal emulation software may be used on the microprocessor for participating in the micro-mainframe link.

In some embodiments, computing systems 920 who are internal to an entity operating the computer system 902 may access the iterative training module 914 internally as an application or process run by the CPU 906.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a web site and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 902 may include one or more internal and/or external data sources (for example, data sources 922). In some embodiments, one or more of the data repositories and the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Cache), a cloud-based database (for example, Amazon RDS, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MongoDB Atlas, Amazon Aurora, Amazon DynamoDB, Amazon Redshift, Amazon ElastiCache, Amazon MemoryDB for Redis, Amazon DocumentDB, Amazon Keyspaces, Amazon Neptune, Amazon Timestream, or The computer system 902 may also access one or more databases 922. The databases 922 may be stored in a database or data repository. The computer system 902 may access the one or more databases 922 through a network 918 or may directly access the database or data repository through I/O devices and interfaces 912. The data repository storing the one or more databases 922 may reside within the computer system 902.

ADDITIONAL EMBODIMENTS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will also be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

What is claimed is:

1. A computer-implemented method for training a classification model comprising:

extracting, by a computing system, a plurality of features from a plurality of executable files, a plurality of features;

generating, by the computing system, a plurality of feature vectors corresponding to the plurality of features extracted from the plurality of executable files, wherein the plurality of features are populated into a training data repository;

selecting, by computing system, from the training data repository, an initial training dataset, wherein the training data repository comprises a first plurality of samples, wherein the initial training dataset comprises a second plurality of samples selected from the first plurality of samples, wherein each sample of the first plurality of samples comprises a known classification;

providing, by the computing system, as an input to the classification model, a first plurality of feature vectors associated with the initial training dataset;

training, by the computing system, using the first plurality of feature vectors, the classification model, wherein the training is performed using supervised learning;

selecting, by the computing system, a third plurality of samples from the training data repository;

determining, by the computing system, a classification of each sample of the third plurality of samples using the classification model;

determining, by the computing system, for each sample of the third plurality of samples, a difference between the determined classification and the known classification;

determining, by the computing system, for each sample of the third plurality of samples, a selection weighting, the selection weighting based on the difference between the determined classification and the known classification;

selecting, by the computing system, from the third plurality of samples, a fourth plurality of samples, wherein a selection probability is based on the determined selection weighting;

training, by the computing system, the classification model using a second plurality of feature vectors associated with the fourth plurality of samples, wherein the training is performed using supervised learning.

2. The computer-implemented method of claim 1, wherein the classification model is configured for binary classification.

3. The computer-implemented method of claim 2, wherein the binary classifications comprise a benign classification and a malicious classification.

4. The computer-implemented method of claim 1, wherein the third plurality of samples comprises the first plurality of samples minus the second plurality of samples.

5. The computer-implemented method of claim 1, wherein the fourth plurality of samples is completely different from the second plurality of samples.

6. The computer-implemented method of claim 1, further comprising:

selecting a fifth plurality of samples from the training data repository;

determining a classification of each sample of the fifth plurality of samples using the classification model;

determining for each sample of the fifth plurality of samples, a difference between the determined classification and the known classification;

determining, for each sample of the fifth plurality of samples, a second selection weighting;

selecting, from the fifth plurality of samples, a sixth plurality of samples, wherein a selection probability is based on the determined selection weighting; and training the classification model using a third plurality of feature vectors associated with the sixth plurality of samples, wherein the training is performed using supervised learning.

7. The computer-implemented method of claim 6, wherein the fifth plurality of samples comprises the first plurality of samples minus the second plurality of samples and minus the fourth plurality of samples.

8. The computer-implemented method of claim 1, wherein the samples comprise executable files.

9. The computer-implemented method of claim 1, further comprising:

determining a first performance characteristic of the model after training the model using the first plurality of feature vectors;

determining a second performance characteristic of the model after training the model using the second plurality of feature vectors;

comparing the first performance characteristic to the second performance characteristic; and determining, based on the comparison, that the first performance characteristic differs from the second performance characteristic by less than a threshold amount.

10. A computer system for training a classification model comprising:

a processor; and a non-volatile storage medium having instructions embodied thereon, wherein the instructions, when executed by the processor, cause the computer system to execute a method comprising:

extracting a plurality of features from a plurality of executable files, a plurality of features;

generating a plurality of feature vectors corresponding to the plurality of features extracted from the plurality of executable files, wherein the plurality of features are populated into a training data repository;

selecting, from the training data repository, an initial training dataset, wherein the training data repository comprises a first plurality of samples, wherein the initial training dataset comprises a second plurality of samples selected from the first plurality of samples, wherein each sample of the first plurality of samples comprises a known classification;

providing, as an input to the classification model, a first plurality of feature vectors associated with the initial training dataset;

training, using the first plurality of feature vectors, the classification model, wherein the training is performed using supervised learning;

selecting a third plurality of samples from the training data repository;

determining a classification of each sample of the third plurality of samples using the classification model;

determining, for each sample of the third plurality of samples, a difference between the determined classification and the known classification;

determining, for each sample of the third plurality of samples, a selection weighting, the selection weighting based on the difference between the determined classification and the known classification;

selecting, from the third plurality of samples, a fourth plurality of samples, wherein a selection probability is based on the determined selection weighting; and training the classification model using a second plurality of feature vectors associated with the fourth plurality of samples, wherein the training is performed using supervised learning.

11. The computer system of claim 10, wherein the classification model is configured for binary classification.

12. The computer system of claim 11, wherein the binary classifications comprise a benign classification and a malicious classification.

13. The computer system of claim 10, wherein the third plurality of samples comprises the first plurality of samples minus the second plurality of samples.

14. The computer system of claim 10, wherein the fourth plurality of samples is completely different from the second plurality of samples.

15. The computer system of claim 10, wherein the method further comprises:

selecting a fifth plurality of samples from the training data repository;

determining a classification of each sample of the fifth plurality of samples using the classification model;

determining for each sample of the fifth plurality of samples, a difference between the determined classification and the known classification;

determining, for each sample of the fifth plurality of samples, a second selection weighting;

selecting, from the fifth plurality of samples, a sixth plurality of samples, wherein a selection probability is based on the determined selection weighting; and training the classification model using a third plurality of feature vectors associated with the sixth plurality of samples, wherein the training is performed using supervised learning.

16. The computer system of claim 15, wherein the fifth plurality of samples comprises the first plurality of samples minus the second plurality of samples and minus the fourth plurality of samples.

17. The computer system of claim 10, wherein the samples comprise executable files.

18. The computer system of claim 10, wherein the method further comprises:

determining a first performance characteristic of the model after training the model using the first plurality of feature vectors;

determining a second performance characteristic of the model after training the model using the second plurality of feature vectors;

comparing the first performance characteristic to the second performance characteristic; and determining, based on the comparison, that the first performance characteristic differs from the second performance characteristic by less than a threshold amount.

19. A non-volatile memory storing instructions that, when executed by a computer, cause the computer to perform a method comprising:

extracting a plurality of features from a plurality of executable files, a plurality of features;

generating a plurality of feature vectors corresponding to the plurality of features extracted from the plurality of executable files, wherein the plurality of features are populated into a training data repository;

selecting, from the training data repository, an initial training dataset, wherein the training data repository comprises a first plurality of samples, wherein the initial training dataset comprises a second plurality of samples selected from the first plurality of samples, wherein each sample of the first plurality of samples comprises a known classification;

providing, as an input to a classification model, a first plurality of feature vectors associated with the initial training dataset;

training, using the first plurality of feature vectors, the classification model, wherein the training is performed using supervised learning;

selecting a third plurality of samples from the training data repository;

determining a classification of each sample of the third plurality of samples using the classification model;

determining, for each sample of the third plurality of samples, a difference between the determined classification and the known classification;

determining, for each sample of the third plurality of samples, a selection weighting, the selection weighting based on the difference between the determined classification and the known classification;

selecting, from the third plurality of samples, a fourth plurality of samples, training the classification model using a second plurality of feature vectors associated with the fourth plurality of samples, wherein the training is performed using supervised learning, wherein the fourth plurality of samples is completely different from the second set of samples.

20. The non-volatile memory of claim 19, wherein the method further comprises:

selecting a fifth plurality of samples from the training data repository;

determining a classification of each sample of the fifth plurality of samples using the classification model;

determining for each sample of the fifth plurality of samples, a difference between the determined classification and the known classification;

determining, for each sample of the fifth plurality of samples, a second selection weighting;

selecting, from the fifth plurality of samples, a sixth plurality of samples, wherein a selection probability is based on the determined selection weighting; and training the classification model using a third plurality of feature vectors associated with the sixth plurality of samples, wherein the training is performed using supervised learning.

* * * * *